United States Patent
Larkin et al.

(10) Patent No.: US 11,240,610 B2
(45) Date of Patent: *Feb. 1, 2022

(54) RATE MATCHING ALGORITHM AND INDEPENDENT DEVICE SYNCHRONIZATION

(71) Applicant: Earlens Corporation, Menlo Park, CA (US)

(72) Inventors: Brendan Larkin, Menlo Park, CA (US); Kyu-Hwa Jeong, Los Gatos, CA (US); Xavier Chabot, Dublin, CA (US)

(73) Assignee: Earlens Corporation, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/006,666

(22) Filed: Aug. 28, 2020

(65) Prior Publication Data
US 2021/0211813 A1    Jul. 8, 2021

Related U.S. Application Data

(63) Continuation of application No. 16/174,911, filed on Oct. 30, 2018, now Pat. No. 10,798,498.

(51) Int. Cl.
*H04R 25/00* (2006.01)
*H04L 29/08* (2006.01)

(52) U.S. Cl.
CPC ......... *H04R 25/554* (2013.01); *H04R 25/505* (2013.01); *H04L 67/12* (2013.01); *H04R 2225/55* (2013.01)

(58) Field of Classification Search
CPC ............... H04R 25/554; H04R 25/505; H04R 2225/55; H04L 67/12
(Continued)

(56) References Cited

U.S. PATENT DOCUMENTS 3,959,588 A    5/1976  Kelly et al.
4,817,014 A    3/1989  Schneider et al.
(Continued)

FOREIGN PATENT DOCUMENTS

DE    3508830 A1    9/1986
KR    100624445 B1  9/2006

OTHER PUBLICATIONS

Notice of Allowance dated Jun. 4, 2020 for U.S. Appl. No. 16/174,911.
(Continued)

*Primary Examiner* — Sean H Nguyen
(74) *Attorney, Agent, or Firm* — Wilson Sonsini Goodrich & Rosati, P.C.

(57) ABSTRACT

Hearing aid systems where a data streaming device streams data to a hearing aid and methods of maintaining synchronization when converting a sampling rate are disclosed. A hearing system comprises a hearing aid, a sampling rate converter, a buffer, an RDWiff signal, and a control circuit. The hearing aid receives data from a data transmission device, and the data received has a first sampling rate. The sampling rate converter is in the hearing aid and converts the sampling rate of the received data to a sampling rate suitable for use by digital signal processing circuitry in the hearing aid. The buffer receives data from the sampling rate converter. The RWDiff signal indicates the difference between the rate at which data is read from and written to the buffer. The control circuit compares the RWDiff signal to a predetermined RWIdeal quantity and generates an adjustment signal.

18 Claims, 16 Drawing Sheets

(58) Field of Classification Search
USPC .......................................................... 381/315
See application file for complete search history.

(56) References Cited

U.S. PATENT DOCUMENTS

| | | | |
|---|---|---|---|
| 5,259,032 | A | 11/1993 | Perkins et al. |
| 5,493,589 | A | 2/1996 | Ibenthal |
| 5,624,376 | A | 4/1997 | Ball et al. |
| 5,783,956 | A | 7/1998 | Ooishi |
| 5,804,109 | A | 9/1998 | Perkins |
| 6,068,589 | A | 5/2000 | Neukermans |
| 6,137,889 | A | 10/2000 | Shennib et al. |
| 6,190,305 | B1 | 2/2001 | Ball et al. |
| 6,491,644 | B1 | 12/2002 | Vujanic et al. |
| 6,529,971 | B1 | 3/2003 | Thiesfeld |
| 6,724,902 | B1 | 4/2004 | Shennib et al. |
| 6,931,231 | B1 | 8/2005 | Griffin |
| 6,940,989 | B1 | 9/2005 | Shennib et al. |
| 7,095,981 | B1 | 8/2006 | Voroba et al. |
| 7,289,639 | B2 | 10/2007 | Abel et al. |
| 7,630,646 | B2 | 12/2009 | Anderson et al. |
| 7,983,435 | B2 | 7/2011 | Moses |
| 8,116,494 | B2 | 2/2012 | Rass |
| 8,157,730 | B2 | 4/2012 | LeBoeuf et al. |
| 8,204,786 | B2 | 6/2012 | LeBoeuf et al. |
| 8,251,903 | B2 | 8/2012 | LeBoeuf et al. |
| 8,320,982 | B2 | 11/2012 | LeBoeuf et al. |
| 8,512,242 | B2 | 8/2013 | LeBoeuf et al. |
| 8,545,383 | B2 | 10/2013 | Wenzel et al. |
| 8,600,089 | B2 | 12/2013 | Wenzel et al. |
| 8,647,270 | B2 | 2/2014 | LeBoeuf et al. |
| 8,652,040 | B2 | 2/2014 | LeBoeuf et al. |
| 8,700,111 | B2 | 4/2014 | LeBoeuf et al. |
| 8,702,607 | B2 | 4/2014 | LeBoeuf et al. |
| 8,788,002 | B2 | 7/2014 | LeBoeuf et al. |
| 8,885,860 | B2 | 11/2014 | Djalilian et al. |
| 8,886,269 | B2 | 11/2014 | LeBoeuf et al. |
| 8,888,701 | B2 | 11/2014 | LeBoeuf et al. |
| 8,923,941 | B2 | 12/2014 | LeBoeuf et al. |
| 8,929,965 | B2 | 1/2015 | LeBoeuf et al. |
| 8,929,966 | B2 | 1/2015 | LeBoeuf et al. |
| 8,934,952 | B2 | 1/2015 | LeBoeuf et al. |
| 8,942,776 | B2 | 1/2015 | LeBoeuf et al. |
| 8,961,415 | B2 | 2/2015 | LeBoeuf et al. |
| 8,989,830 | B2 | 3/2015 | LeBoeuf et al. |
| 9,044,180 | B2 | 6/2015 | LeBoeuf et al. |
| 9,131,312 | B2 | 9/2015 | LeBoeuf et al. |
| 9,289,135 | B2 | 3/2016 | LeBoeuf et al. |
| 9,289,175 | B2 | 3/2016 | LeBoeuf et al. |
| 9,301,696 | B2 | 4/2016 | LeBoeuf et al. |
| 9,314,167 | B2 | 4/2016 | LeBoeuf et al. |
| 9,392,377 | B2 | 7/2016 | Olsen et al. |
| 9,427,191 | B2 | 8/2016 | LeBoeuf |
| 9,521,962 | B2 | 12/2016 | LeBoeuf |
| 9,538,921 | B2 | 1/2017 | LeBoeuf et al. |
| 9,750,462 | B2 | 9/2017 | LeBoeuf et al. |
| 9,788,785 | B2 | 10/2017 | LeBoeuf |
| 9,788,794 | B2 | 10/2017 | LeBoeuf et al. |
| 9,794,653 | B2 | 10/2017 | Aumer et al. |
| 9,801,552 | B2 | 10/2017 | Romesburg |
| 9,808,204 | B2 | 11/2017 | LeBoeuf et al. |
| 10,798,498 | B2 | 10/2020 | Larkin et al. |
| 10,937,433 | B2 | 3/2021 | Larkin |
| 2005/0089183 | A1 | 4/2005 | Niederdrank et al. |
| 2009/0276550 | A1 | 11/2009 | Megarity |
| 2010/0107013 | A1 | 4/2010 | Mopur et al. |
| 2010/0220409 | A1 | 9/2010 | Shibano |
| 2010/0226032 | A1 | 9/2010 | Sato |
| 2010/0238578 | A1 | 9/2010 | Ueno |
| 2011/0007585 | A1 | 1/2011 | Shan et al. |
| 2011/0150252 | A1 | 6/2011 | Solum et al. |
| 2014/0112466 | A1 | 4/2014 | Bao et al. |
| 2014/0226830 | A1 | 8/2014 | Feldt |
| 2015/0201289 | A1 | 7/2015 | Solum et al. |
| 2017/0013371 | A1 | 1/2017 | Pedersen et al. |
| 2017/0078807 | A1 | 3/2017 | Mustiere et al. |
| 2018/0019748 | A1 | 1/2018 | Hisamoto |
| 2020/0135215 | A1 | 4/2020 | Larkin |

OTHER PUBLICATIONS

Notice of Allowance dated Jul. 8, 2020 for U.S. Appl. No. 16/174,911.
Dundas et al. The Earlens Light-Driven Hearing Aid: Top 10 questions and answers. Hearing Review. 2018;25(2):36-39.
Fay, et al. Preliminary evaluation of a light-based contact hearing device for the hearing impaired. Otol Neurotol. Jul. 2013;34(5):912-21. doi: 10.1097/MAO.0b013e31827de4b1.
Fritsch, et al. EarLens transducer behavior in high-field strength MRI scanners. Otolaryngol Head Neck Surg. Mar. 2009;140(3):426-8. doi: 10.1016/j.otohns.2008.10.016.
Gantz, et al. Broad Spectrum Amplification with a Light Driven Hearing System. Combined Otolaryngology Spring Meetings, 2016 (Chicago).
Gantz, et al. Light Driven Hearing System: A Multi-Center Clinical Study. Association for Research in Otolaryngology Annual Meeting, 2016 (San Diego).
Gantz, et al. Light-Driven Contact Hearing Aid for Broad Spectrum Amplification: Safety and Effectiveness Pivotal Study. Otology & Neurotology Journal, 2016 (in review).
Gantz, et al. Light-Driven Contact Hearing Aid for Broad-Spectrum Amplification: Safety and Effectiveness Pivotal Study. Otology & Neurotology. Copyright 2016. 7 pages.
Jian, et al. A 0.6 V, 1.66 mW energy harvester and audio driver for tympanic membrane transducer with wirelessly optical signal and power transfer. InCircuits and Systems (ISCAS), 2014 IEEE International Symposium on Jun. 1, 2014. 874-7. IEEE.
Khaleghi, et al. Attenuating the ear canal feedback pressure of a laser-driven hearing aid. J Acoust Soc Am. Mar. 2017;141(3):1683.
Khaleghi, et al. Attenuating the feedback pressure of a light-activated hearing device to allows microphone placement at the ear canal entrance. IHCON 2016, International Hearing Aid Research Conference, Tahoe City, CA, Aug. 2016.
Khaleghi, et al. Characterization of Ear-Canal Feedback Pressure due to Umbo-Drive Forces: Finite-Element vs. Circuit Models. ARO Midwinter Meeting 2016, (San Diego).
Khaleghi, et al. Mechano-Electro-Magnetic Finite Element Model of a Balanced Armature Transducer for a Contact Hearing Aid. Proc. MoH 2017, Mechanics of Hearing workshop, Brock University, Jun. 2017.
Khaleghi, et al. Multiphysics Finite Element Model of a Balanced Armature Transducer used in a Contact Hearing Device. ARO 2017, 40th ARO MidWinter Meeting, Baltimore, MD, Feb. 2017.
Lee, et al. A Novel Opto-Electromagnetic Actuator Coupled to the tympanic Membrane. J Biomech. Dec. 5, 2008;41(16):3515-8. Epub Nov. 7, 2008.
Lee, et al. The optimal magnetic force for a novel actuator coupled to the tympanic membrane: a finite element analysis. Biomedical engineering: applications, basis and communications. 2007; 19(3):171-177.
Levy, et al. Characterization of the available feedback gain margin at two device microphone locations, in the fossa triangularis and Behind the Ear, for the light-based contact hearing device. Acoustical Society of America (ASA) meeting, 2013 (San Francisco).
Levy, et al. Extended High-Frequency Bandwidth Improves Speech Reception in the Presence of Spatially Separated Masking Speech. Ear Hear. Sep.-Oct. 2015;36(5):e214-24. doi: 10.1097/AUD.0000000000000161.
Levy et al. Light-driven contact hearing aid: a removable direct-drive hearing device option for mild to severe sensorineural hearing impairment. Conference on Implantable Auditory Prostheses, Tahoe City, CA, Jul. 2017. 4 pages.
McElveen et al. Overcoming High-Frequency Limitations of Air Conduction Hearing Devices Using a Light-Driven Contact Hearing Aid. Poster presentation at The Triological Society, 120th Annual Meeting at COSM, Apr. 28, 2017; San Diego, CA.
Moore, et al. Spectro-temporal characteristics of speech at high frequencies, and the potential for restoration of audibility to people

(56) References Cited

OTHER PUBLICATIONS with mild-to-moderate hearing loss. Ear Hear. Dec. 2008;29(6):907-22. doi: 10.1097/AUD.0b013e31818246f6.
Perkins, et al. Light-based Contact Hearing Device: Characterization of available Feedback Gain Margin at two device microphone locations. Presented at AAO-HNSF Annual Meeting, 2013 (Vancouver).
Perkins, et al. The EarLens Photonic Transducer: Extended bandwidth. Presented at AAO-HNSF Annual Meeting, 2011 (San Francisco).
Perkins, et al. The EarLens System: New sound transduction methods. Hear Res. Feb. 2, 2010; 10 pages total.
Perkins, R. Earlens tympanic contact transducer: a new method of sound transduction to the human ear. Otolaryngol Head Neck Surg. Jun. 1996;114(6):720-8.
Puria, et al. Cues above 4 kilohertz can improve spatially separated speech recognition. The Journal of the Acoustical Society of America, 2011, 129, 2384.
Puria, et al. Extending bandwidth above 4 kHz improves speech understanding in the presence of masking speech. Association for Research in Otolaryngology Annual Meeting, 2012 (San Diego).
Puria, et al. Extending bandwidth provides the brain what it needs to improve hearing in noise. First international conference on cognitive hearing science for communication, 2011 (Linkoping, Sweden).
Puria, et al. Hearing Restoration: Improved Multi-talker Speech Understanding. 5th International Symposium on Middle Ear Mechanics In Research and Otology (MEMRO), Jun. 2009 (Stanford University).
Puria, et al. Imaging, Physiology and Biomechanics of the middle ear: Towards understating the functional consequences of anatomy. Stanford Mechanics and Computation Symposium, 2005, ed Fong J.
Puria, et al. Sound-Pressure Measurements In The Cochlear Vestibule of Human-Cadaver Ears. Journal of the Acoustical Society of America. 1997; 101 (5-1): 2754-2770.
Puria, et al. Temporal-Bone Measurements of the Maximum Equivalent Pressure Output and Maximum Stable Gain of a Light-Driven Hearing System That Mechanically Stimulates the Umbo. Otol Neurotol. Feb. 2016;37(2):160-6. doi: 10.1097/MAO.0000000000000941.
Puria, et al. The EarLens Photonic Hearing Aid. Association for Research in Otolaryngology Annual Meeting, 2012 (San Diego).
Puria, et al. The Effects of bandwidth and microphone location on understanding of masked speech by normal-hearing and hearing-impaired listeners. International Conference for Hearing Aid Research (IHCON) meeting, 2012 (Tahoe City).
Puria. Measurements of human middle ear forward and reverse acoustics: implications for otoacoustic emissions. J Acoust Soc Am. May 2003;113(5):2773-89.
Puria, S. Middle Ear Hearing Devices. Chapter 10. Part of the series Springer Handbook of Auditory Research pp. 273-308. Date: Feb. 9, 2013.
Smith, Julius O. Digital Audio Resampling Home Page. CCRMA—Stanford University. Jan. 2012. 19 pages, http://www-ccrma.stanford.edu/~jos/resample/.
Song, et al. The development of a non-surgical direct drive hearing device with a wireless actuator coupled to the tympanic membrane. Applied Acoustics. Dec. 31, 2013;74(12):1511-8.
Struck, et al. Comparison of Real-world Bandwidth in Hearing Aids vs Earlens Light-driven Hearing Aid System. The Hearing Review. TechTopic: EarLens. Hearingreview.com. Mar. 14, 2017. pp. 24-28.
Folkeard, et al. Detection, Speech Recognition, Loudness, and Preference Outcomes With a Direct Drive Hearing Aid: Effects of Bandwidth. Trends Hear. Jan.-Dec. 2021; 25: 1-17. doi: 10.1177/2331216521999139.

RATE MATCHING ALGORITHM AND INDEPENDENT DEVICE SYNCHRONIZATION

CROSS-REFERENCE

This application is a continuation of U.S. patent application Ser. No. 16/174,911, filed Oct. 30, 2018, now U.S. Pat. No. 10,798,498; which is incorporated herein by reference in its entirety.

BACKGROUND OF THE INVENTION

Field of the Invention

The present invention is directed to a new rate matching algorithm and synchronization scheme which is used to achieve well-synchronized audio on independent devices without any device-to-device communication or re-transmission.

Background

In hearing aids which support data streaming from peripheral devices such as smart phones, the data may be streamed separately to a right hearing aid and a left hearing aid. In such systems, there may be times when there are lost data packets or when the data streamed to the right hearing aid is not matched with the data streamed to the left hearing aid. Additionally, variations between hearing aids, including variations in clock speed or variations caused by clock jitter will result in lack of synchronization between the hearing aids in processing the data. In certain situations, this loss of data and/or lack of synchronization may lead to problems for the user, including a perception that the audio coming out of the hearing aid is panning from one hearing aid to the other (e.g., from the listener's right ear to the listener's left ear).

In such systems, the data source (e.g. an iPhone) sends separate data streams for the left hearing aid and the right hearing aid. This is accomplished by sending a first data packet to a first (e.g., left) hearing aid followed in time by a second data packet for a second (e.g., right) hearing aid, the subsequent data packets alternating between the hearing aids. The source alternates sending data packets for the left and right ear to form the data stream for each ear. Initialization problems may result from timing delays or lost data packets. For example, the introduction of a delay between the first packet for the first hearing aid and the first packet for the second hearing aid would, if not corrected, create a delay in the sound received by the user between the first and second ears. In addition, in starting the data stream, there may be times when one of the initial or subsequent packets are lost (i.e., not received by the designate hearing aid), potentially resulting in the data packet processed by the first hearing aid not being aligned with the data packet processed by the second hearing aid (e.g., the left hearing aid could wind up processing the first data packet while the right ear was processing the second data packet).

Even if there are no initialization problems, problems with synchronization may result from differing rate matching and/or internal clock rates between the right and left hearing aids. Rate matching is a process wherein data transmitted at a first sampling rate (for example, the sampling rate used by a smart phone) is re-sampled at a second rate (for example, the sampling rate used by a digital signal processing circuit in a hearing aid) in order to match the sampling rate of the transmitted data to the sampling rate used by the digital signal processor (DSP). In such systems, the sampling rate of the transmitted data is generally fixed and stable while the sampling rate of the digital signal processor may vary, either over time or between individual digital signal processors or both. As one example, the sampling rate of the digital signal processor may fluctuate as a result of fluctuations in the clock which drives the digital signal processor. The function of the sampling rate converter in a hearing aid is to, without knowing the actual sampling rate of the digital signal processor, convert the received signal from the sampling rate of the transmitted data to the sampling rate of the digital signal processor in the hearing aid to which the data is being transmitted. In making this conversion, it would be beneficial to avoid the synchronization problems mentioned above.

The conversion of received data having the sampling rate used by the data transmission device (e.g., a cell phone) to the sampling rate used by an individual digital signal processor may be referred to as "resampling". In one example, resampling consists of taking an audio file on a cell phone, which is sampled at a 16 Kilohertz (KHz) sample rate, transmitting it to a hearing aid, and, after receipt, converting it to a different (e.g., higher) sampling rate, e.g. 24.6 KHz. In this example, for every two samples of the transmitted signal the sampling rate converter in the hearing aid will need to produce approximately three samples for the digital signal processor to process. In the sampling rate converter, the sample rate conversion process is controlled by a rate matching algorithm. The rate matching algorithm controls how fast the sampling rate conversion happens. The rate matching algorithm helps the sampling rate conversion to be more precise/accurate.

Because the sampling rate of each individual digital signal processor is not a constant and may vary from digital signal processor to digital signal processor or may vary over time within an individual hearing aid, the rate matching algorithm in the sampling rate converter must adapt to the sampling rate of the digital signal processor to which it is connected. In practice the digital signal processor takes data from a converter output buffer connected to the rate matching circuitry. In an ideal situation the sampling rate used in the rate sampling algorithm to convert the data sampling rate would match the sampling rate used in the digital signal processor to which the converter output buffer was connected. In this event, the rate at which data was read from the converter output buffer would match the rate at which data was written to the converter output buffer. In the event that the rate at which data is read from the converter output buffer is greater or less than the rate at which data is written to the converter output buffer, then, after a time, the data read by the digital signal processor will not be the data written to the converter output buffer. When the sampling rate of the digital signal processor is unknown, the sampling rate algorithm must determine a sampling rate that ensures that the data read by the digital signal processor corresponding to a particular data packet is the data written to the converter output buffer for that data packet. The sampling rate algorithm must therefore overcome the problem of lack of synchronization between the production of data by the sampling rate converter and the rate data is taken up by the digital signal processor. This synchronization is particularly important in hearing aids where the digital signal processor does not check to see if the data is valid, it just reads what is in the buffer. In these systems, it is imperative that the sampling rate converter select a sampling rate that ensures that the data in the converter output buffer is valid data.

As another way of describing this problem, when streaming audio over a radio frequency link, such as those used for hearing aids (e.g., a Bluetooth LE (low energy) link), the incoming data needs to be converted to match the sampling rate of the receiving device. Because the device's actual sampling rate has some variability, a rate matching algorithm may be used to adjust the resampling ratio to match the actual sampling rate. When streaming to a pair of devices, such as a pair of hearing aids, this adjustment happens independently in each device. The result is that the resampled signal may be delayed differently on each device, even though they are receiving the same audio data. This relative delay can vary over time, causing a sensation of changing spatial cues due to changing interaural time differences.

Depending upon the system, these synchronization problems may be caused by or be aggravated by clock jitter in the hearing aid circuitry. In hearing aids, it is desirable to utilize components and circuits which draw very little power in order to preserve battery life. Unfortunately, one of the tradeoffs inherent in using such circuitry is that the clock may not be as stable as a clock which uses more power. Such clock jitters will introduce additional uncertainty in the sampling rate of the digital signal processor, making it more difficult to match the read and write rates of the data read from and written to the converter output buffer.

In prior systems, this synchronization problem may be resolved using an algorithm that looks at the amount of unread data in the converter output buffer. If the amount of unread data in the converter output buffer reached a predetermined maximum, the sampling rate would be reset to a predetermined low value to allow the digital signal processor to catch up with the output of the sampling rate converter. If the amount of unread data in the converter output buffer reached a predetermined minimum value, the sampling rate would be increased to a predetermined maximum value to allow the converter output buffer to re-fill. Unfortunately, toggling the sampling rate between predetermined high and low values created artifacts which could be heard by users. It also made it extremely difficult to align the outputs of the left and right hearing aids. In some instances, the resulting audio would sound to the user like it was panning between the left and right ears.

In some prior art systems, the rate matching algorithm, such as, for example, those available from Dynamic Hearing tracks the value of the difference between the read and write data in a buffer and makes an adjustment every time that difference was outside a certain margin of its ideal value. The magnitude of this adjustment is a fixed value that gradually becomes smaller over time, so the algorithm makes finer and finer adjustments. The initial adjustment, however, changed the sampling rate by a value which could result in time delays on the order of several milliseconds between each device (e.g., over 100 Hz).

Other prior art systems may utilize data encoded in the transmit signal (e.g., time tags such as those used in television to control clocks in the television receiver) to ensure that the left and right hearing aids know when the data was transmitted, making it possible to synchronize the hearing aids and to compensate for issues such as clock jitter. Unfortunately, such encoded data is not always available and is not generally included in the type of blue tooth low energy transmissions which are used to link hearing aids to data streaming devices. In other systems, a communication link may be established between hearing aids, allowing them to synchronize data processing and clocks. Unfortunately, not all hearing aids are adapted to communicate between pairs in a set and cannot, therefore, rely on those communications to provide synchronization.

The problem of mismatched sampling delays may alternatively be solved by allowing the devices in a pair (e.g., hearing aids) to communicate with each other and exchange synchronization information. However, in certain environments, including some hearing aids, the devices may not have a mechanism for communicating with each other. Thus, it would be beneficial to provide a system whereby mismatched sampling delays may be corrected without the benefit of communication between the devices experiencing the mismatched sampling delays.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The foregoing and other objects, features, and advantages of embodiments of the present inventive concepts will be apparent from the more particular description of preferred embodiments, as illustrated in the accompanying drawings in which like reference characters refer to the same or like elements. The drawings are not necessarily to scale, emphasis instead being placed upon illustrating the principles of the preferred embodiments.

DETAILED DESCRIPTION OF THE INVENTION

Definitions

Figure 1:
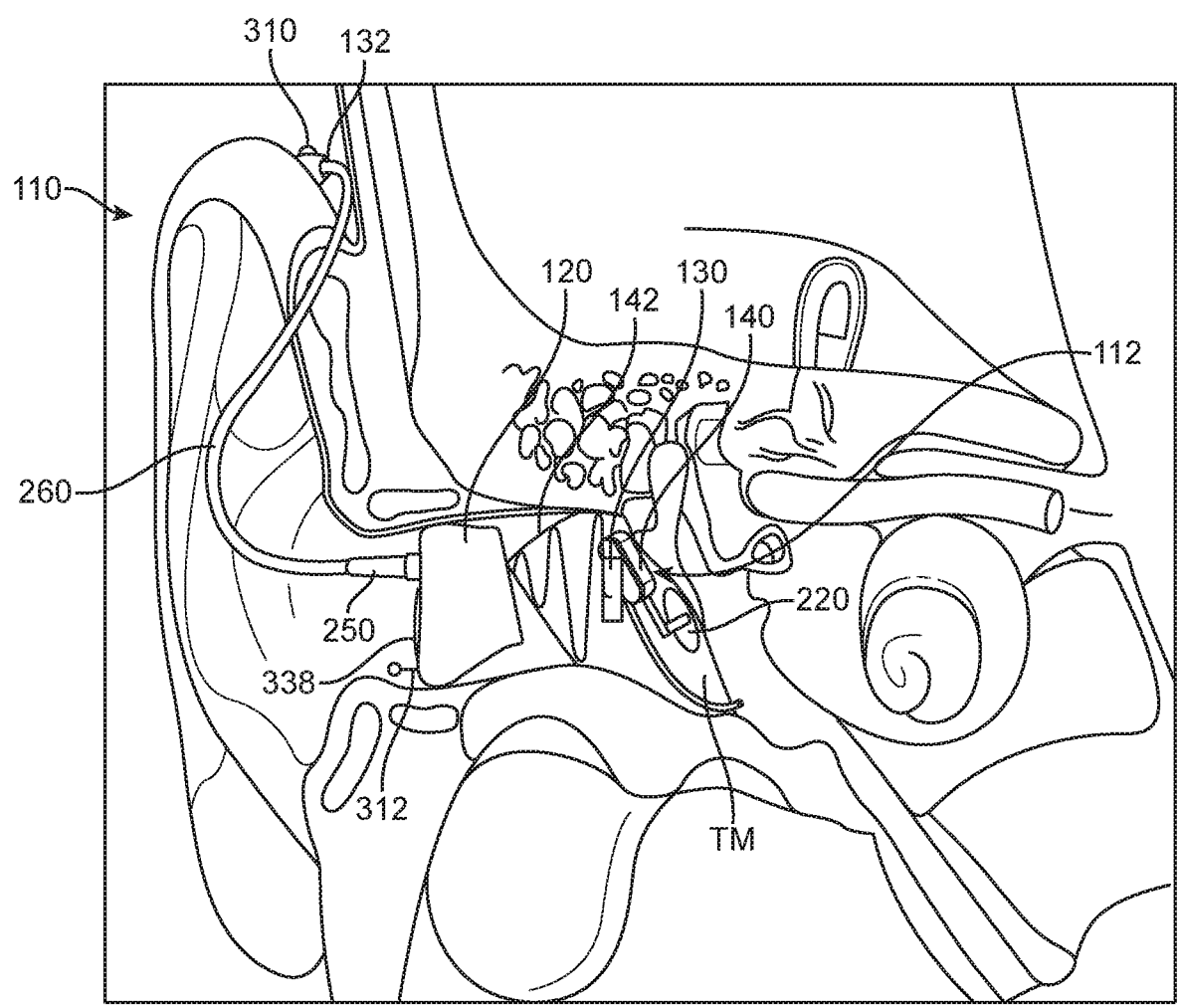
FIG. 1 is a cutaway view of an ear canal showing a light coupled contact hearing system for use in a method according to the present invention wherein at least a portion of the contact hearing system is positioned in the ear canal.

Audio Processor—A system for receiving and processing audio signals. Audio processors may include one or more microphones adapted to receive audio which reaches the user's ear. The audio processor may include one or more components for processing the received sound. The audio processor may include digital signal processing electronics and software which are adapted to process the received sound. Processing of the received sound may include amplification of the received sound. The output of the audio processor may be a signal suitable for driving a laser located in an ear tip. The output of the audio processor may be a signal suitable for driving an antenna located in an ear tip. The output of the audio processor may be a signal suitable for driving an inductive coil located in an ear tip. Audio processors may also be referred to as behind the ear units or BTEs.

Contact Hearing System—A system including a contact hearing device, an ear tip and an audio processor. Contact hearing systems may also include an external communication device. An example of such system is an Earlens hearing-aid that transmits audio signal by laser to a contact hearing device which is located on or adjacent to the ear drum. The contact hearing system may also be referred to as a smart lens.

Contact Hearing Device—A tiny actuator connected to a customized ring-shaped support platform that floats on the ear canal around the eardrum, where the actuator directly vibrates the eardrum causing energy to be transmitted through the middle and inner ears to stimulate the brain and produce the perception of sound. The contact hearing device may comprise a photodetector, a microactuator connected to the photodetector and a support structure supporting the photodetector and microactuator. The contact hearing device may comprise an antenna, a microactuator connected to the antenna and a support structure supporting the antenna and microactuator. The contact hearing device may comprise a coil, a microactuator connected to the coil, and a support structure supporting the coil and microactuator. The contact hearing device may also be referred to as a Tympanic Contact Actuator (TCA), a Tympanic Lens, a Tympanic Membrane Transducer (TMT), a smart lens.

Ear Tip—A structure designed to be placed into and reside in the ear canal of a user, where the structure is adapted to receive signals from an audio processor and transmit signals to the user's tympanic membrane or to a device positioned on or near the user's tympanic membrane (such as, for example, a contact hearing device). In one embodiment of the invention, the signals may be transmitted by light, using, for example, a laser positioned in the light tip. In one embodiment of the invention, the signals may be transmitted using radio frequency, using, for example, an antenna connected to the Ear Tip. In one embodiment of the invention the signal may be transmitted using inductive coupling, using, for example, a coil connected to the ear tip. The ear tip may also be referred to as a light tip, magnetic tip or mag tip.

Light Driven Hearing Aid System—A contact hearing system wherein signals are transmitted from an ear tip to a contact hearing device using light. In a light driven hearing system, light (e.g., laser light) may be used to transmit information, power or both information and power to a contact hearing device.

RF Driven Hearing Aid System—A contact hearing system wherein signals are transmitted from an ear tip to a contact hearing device using radio frequency electromagnetic radiation. In an RF driven hearing system, electromagnetic radiation may be used to transmit information, power or both information and power from the ear tip to the contact hearing device.

Inductively Driven Hearing Aid System—A contact hearing system wherein signals are transmitted from an ear tip to a contact hearing device using inductive coupling. In an inductively driven hearing system, magnetic waves may be used to transmit information, power or both information and power from the ear tip to the contact hearing device.

Light Tip—An ear tip adapted for use in a light driven hearing aid system. A light tip may include a laser.

Mag Tip—An ear tip adapted for use in an inductively driven hearing aid system. The mag tip may include an inductive transmit coil.

While the preferred embodiments of the devices and methods have been described in reference to the environment in which they were developed, they are merely illustrative of the principles of the present inventive concepts. Modification or combinations of the above-described assemblies, other embodiments, configurations, and methods for carrying out the invention, and variations of aspects of the invention that are obvious to those of skill in the art are intended to be within the scope of the claims. In addition, where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claim.

FIG. 1 is a cutaway view of an ear canal showing a light coupled contact hearing system for use in a method according to the present invention wherein at least a portion of the contact hearing system is positioned in the ear canal. FIG. 1 is a cutaway view of an ear canal showing a contact hearing system 110 for use in a method according to the present invention, wherein the contact hearing system 110 is positioned in the ear canal. In embodiments of the invention, contact hearing system 110 may comprise a contact hearing system using light to transmit information and/or power from the ear tip to the contact hearing device. In FIG. 1, contact hearing system 110 includes audio processor 132, which audio processor may include at least one external microphone 310. Audio processor 132 may be connected to an ear tip 120 by cable 260, which is adapted to transmit signals from audio processor 132 to ear tip 120. Taper tube 250 may be used to support cable 260 at ear tip 120. Ear tip 120 may further include canal microphone 312 and acoustic vent 338. Ear tip 120 may be a light tip which radiates light pulses 142 in response to signals from audio processor 132. Light or other signals radiated by ear tip 120 may be received by contact hearing device 112, which may comprise photodetector 130, microactuator 140, and umbo lens 220. Contact hearing device 112 may be positioned on tympanic membrane TM.

Figure 2:
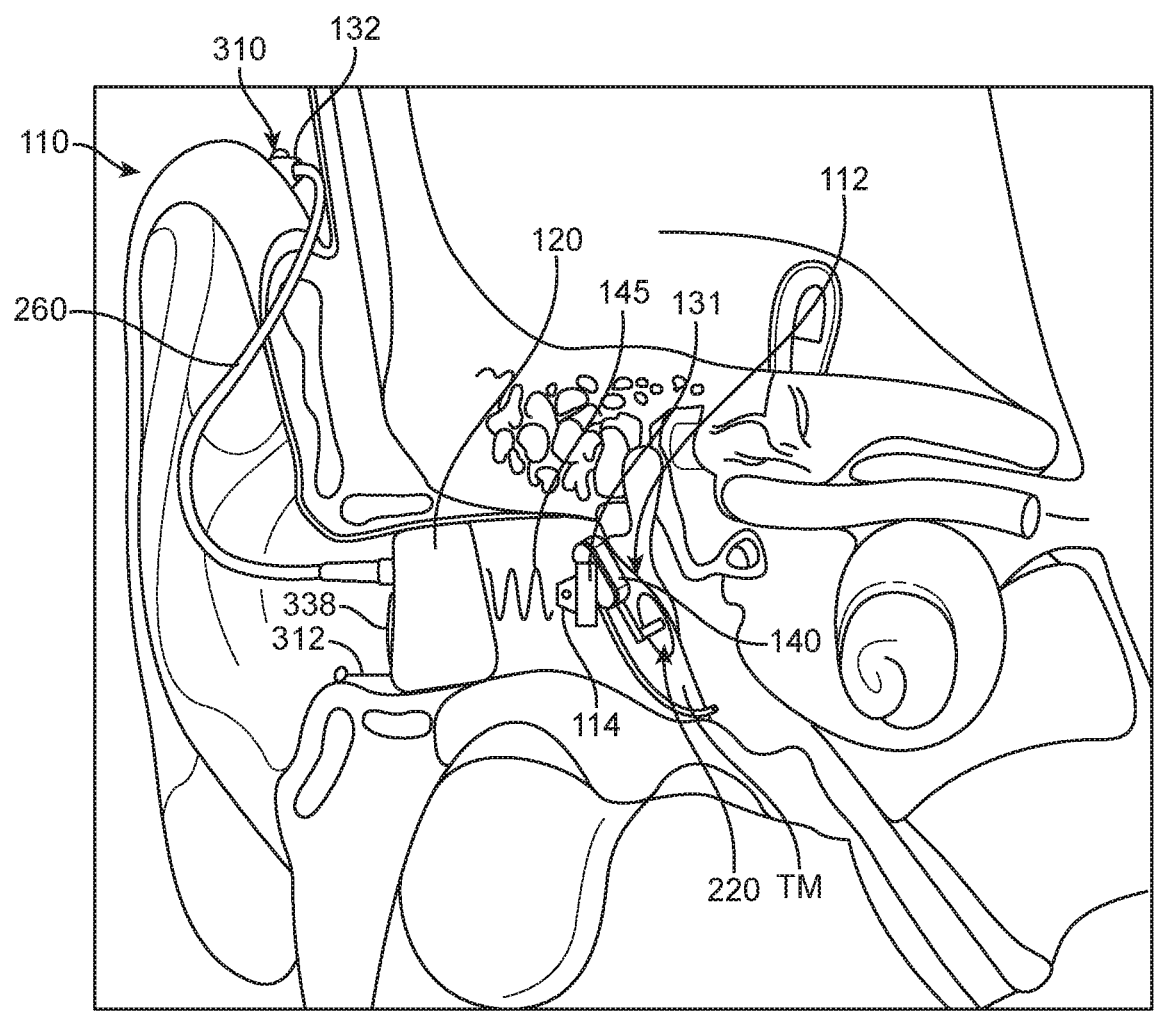
FIG. 2 is a cutaway view of an ear canal showing an inductively coupled contact hearing system according to the present invention wherein at least a portion of the contact hearing system is positioned in the ear canal.

FIG. 2 is a cutaway view of an ear canal showing a contact hearing system 110 for use in systems and methods according to the present invention, wherein at least a portion of the contact hearing system 110 is positioned in the ear canal. In embodiments of the invention, contact hearing system 110 may comprise a contact hearing system using electromagnetic waves 145 to transmit information and/or power from ear tip 120 to the contact hearing device 112. In embodiments of the invention, contact hearing system 110 may comprise a contact hearing system using inductive coupling to transmit information and/or power from ear tip 120 to contact hearing device 112. In FIG. 2, contact hearing system 110 may include Audio processor 132, which audio processor may include at least one external microphone 310. Audio processor 132 may be connected to an ear tip 120 by cable 260 which is adapted to transmit signals from audio processor 132 to ear tip 120. Ear tip 120 may further include canal microphone 312 and at least one acoustic vent 338. Ear tip 120 may be an ear tip which radiates electromagnetic waves 145 in response to signals from audio processor 132. Electromagnetic signals radiated by ear tip 120 may be received by contact hearing device 112, which may comprise receive coil 131, microactuator 140, and umbo lens 220. Contact hearing device 112 may further include grasping tab 114.

Figure 3:
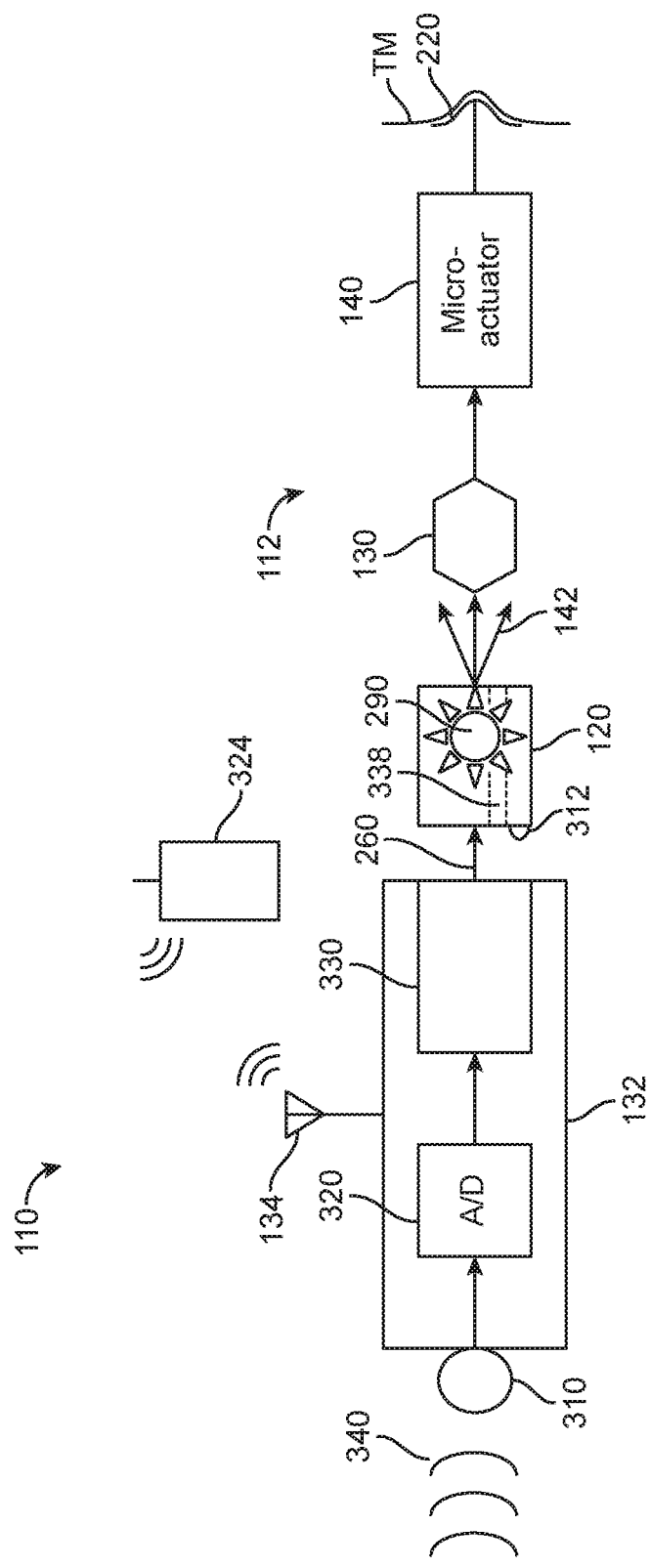
FIG. 3 is a block diagram of a light coupled contact hearing system for use in a method according to the present invention.

FIG. 3 is a block diagram of a light coupled contact hearing system for use in a method according to the present invention wherein the contact hearing system 110 may be positioned in the ear canal of a user. In embodiments of the invention, contact hearing system 110 may include one or more external communication and control devices 324, which may also act as a data transmission device 400. In embodiments of the invention, audio processor 132 may communicate with external communication and control devices 324 by, for example, using audio processor antenna 134. In FIG. 3, contact hearing system 110 may include audio processor 132, ear tip 120 and contact hearing device 112. Audio processor 132 may include external microphone 310, audio processor antenna 134, analog to digital converter 320 and signal processor 330. Audio processor 132 may be connected to ear tip 120 by cable 260. Ear tip 120, which may also be referred to as a light tip, may include light source 290 (which may be a laser), acoustic vent 338 and canal microphone 312. Signals, including data and power, may be transmitted from ear tip 120 to contact hearing device 112 using light, such as light pulses 142. Contact hearing device 112 may include photodetector 130, microactuator 140 and umbo lens 220. Umbo lens 220 may be positioned to contact tympanic membrane TM. In FIG. 3, acoustic input 340 (which may be an ambient sound or an audible sound) may be received by external microphone 310 of audio processor 132, which then processes the received sound by passing it through processing circuitry, which may include analog to digital converter 320 and signal processor 330.

Figure 4:
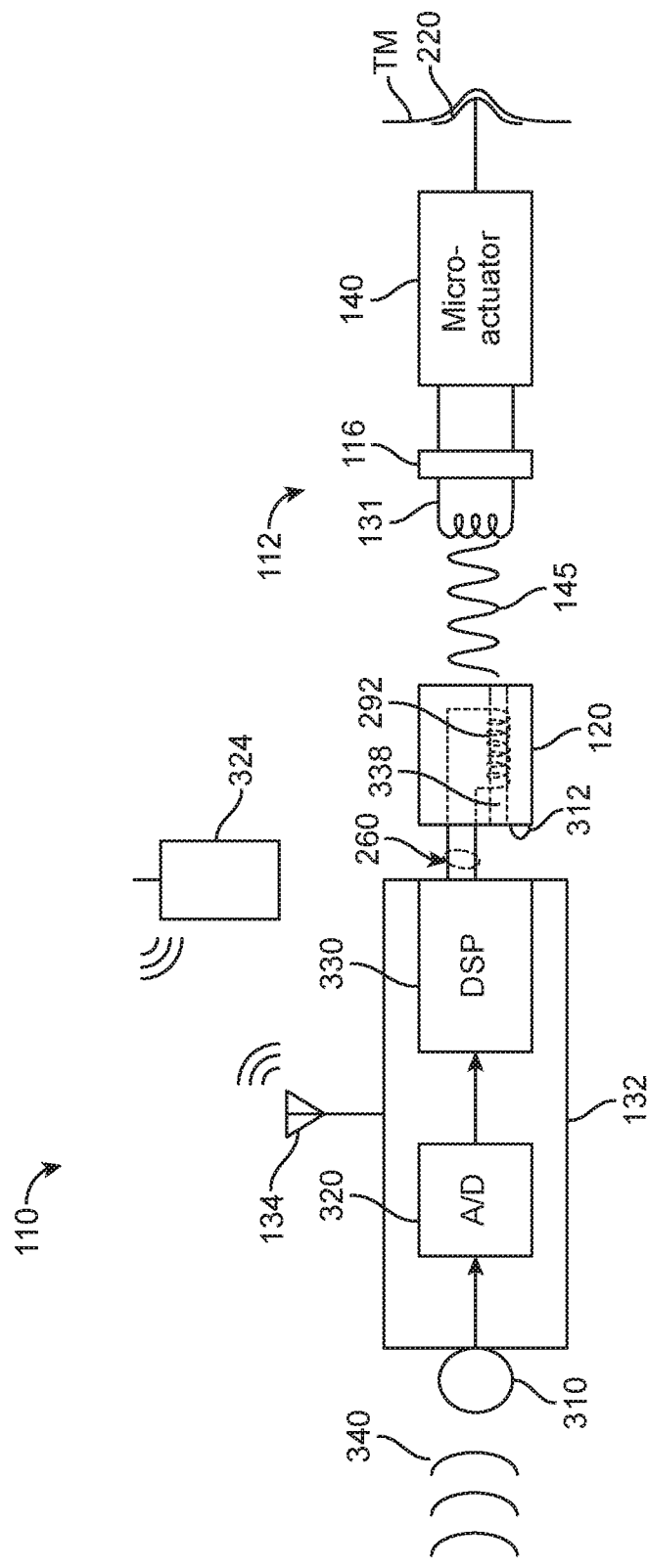
FIG. 4 is a block diagram of an inductively coupled contact hearing system for use in a method according to the present invention.

FIG. 4 is a block diagram of a contact hearing system 110 for use in methods and apparatus according to the present invention. In embodiments of the invention, at least a portion of contact hearing system 110 is positioned in the ear canal of a user. In FIG. 4, acoustic input 340 may be received by external microphone 310 of audio processor 132, which then processes the received sound by passing it through processing circuitry, which may include analog to digital converter 320 and signal processor 330. The output of audio processor 132 may be transmitted to an ear tip 120 by cable 260. Signals transmitted to ear tip 120 may then be transmitted to contact hearing device 112 by, for example, causing transmit coil 292 to radiate electromagnetic waves 145. In embodiments of the invention, contact hearing device 112 may include receive coil 131, demodulator 116, microactuator 140, and umbo lens 220. Information contained in electromagnetic waves 145 received by receive coil 131 may be transmitted through demodulator 116 to microactuator 140, moving umbo lens 220. In embodiments of the invention, the signal transmitted to ear tip 120 may be a signal representative of the received audio signal which may then be transmitted to contact hearing device 112. In embodiments of the invention, transmit coil 292 may be wound around an acoustic vent 338 in ear tip 120. In embodiments of the invention, acoustic vent 338 may be formed as a passage through a ferrite material. In embodiments of the invention, transmit coil 292 may be wound around ferrite material positioned in ear tip 120. In embodiments of the invention, contact hearing system 110 may include one or more external communication and control devices 324, such as, for example, a cell phone. In embodiments of the invention, audio processor 132 may communicate with external communication and control devices 324 by, for example, using audio processor antenna 134. Umbo lens 220 may be positioned to contact tympanic membrane TM. Ear tip 120 may include canal microphone 312.

Figure 5:
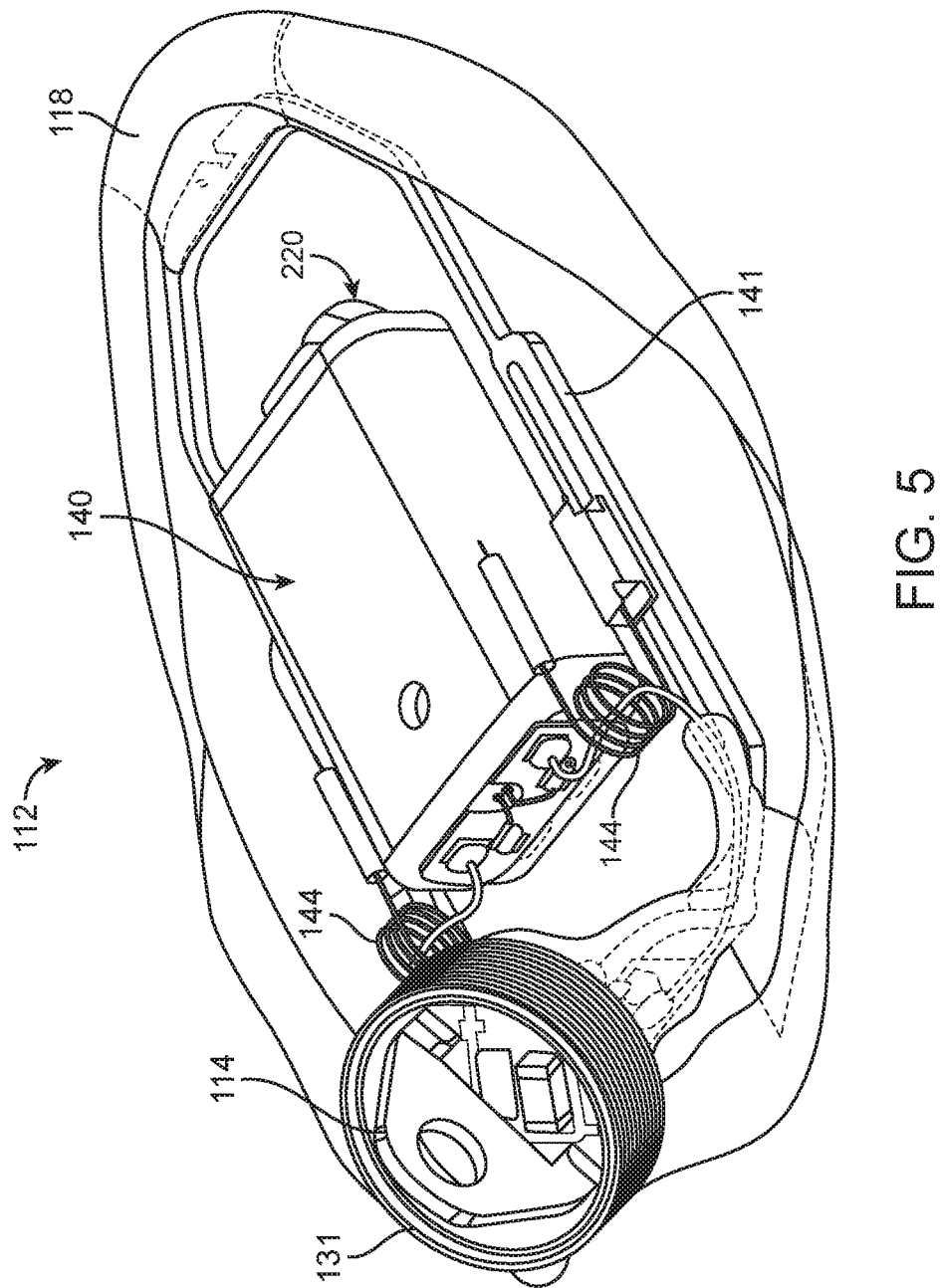
FIG. 5 is a top view of an inductively coupled contact hearing device for use in systems and methods according to the present invention.
Figure 6:
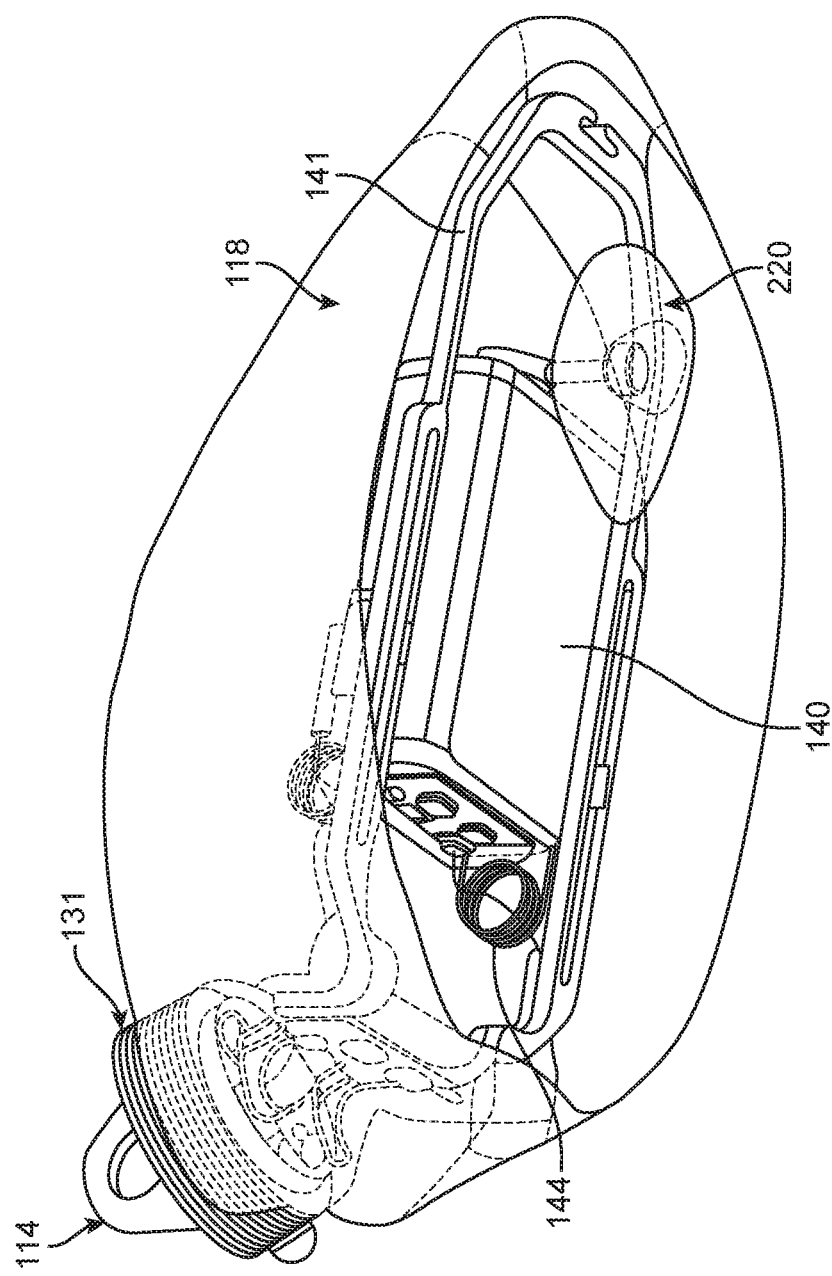
FIG. 6 is a bottom view of an inductively coupled contact hearing device for use in systems and methods according to the present invention.

FIG. 5 is a top view of a contact hearing device 112 according to the present invention. FIG. 6 is a bottom view of a contact hearing device 112 according to the present invention. The contact hearing device 112 illustrated in FIGS. 5 and 6 includes a receive coil 131, a microactuator 140, an umbo lens 220, a support structure 141, and springs 144. In the embodiment illustrated in FIGS. 5 and 6, microactuator 140 is connected to support structure 141 by springs 144. In embodiments of the invention, contact hearing device 112 may further include a sulcus platform 118, which may also be referred to as a mounting platform, connected to support structure 141 and adapted to assist in positioning contact hearing device 112 in the ear canal of a user. In embodiments of the invention, contact hearing device 112 may further include grasping tab 114.

Figure 7:
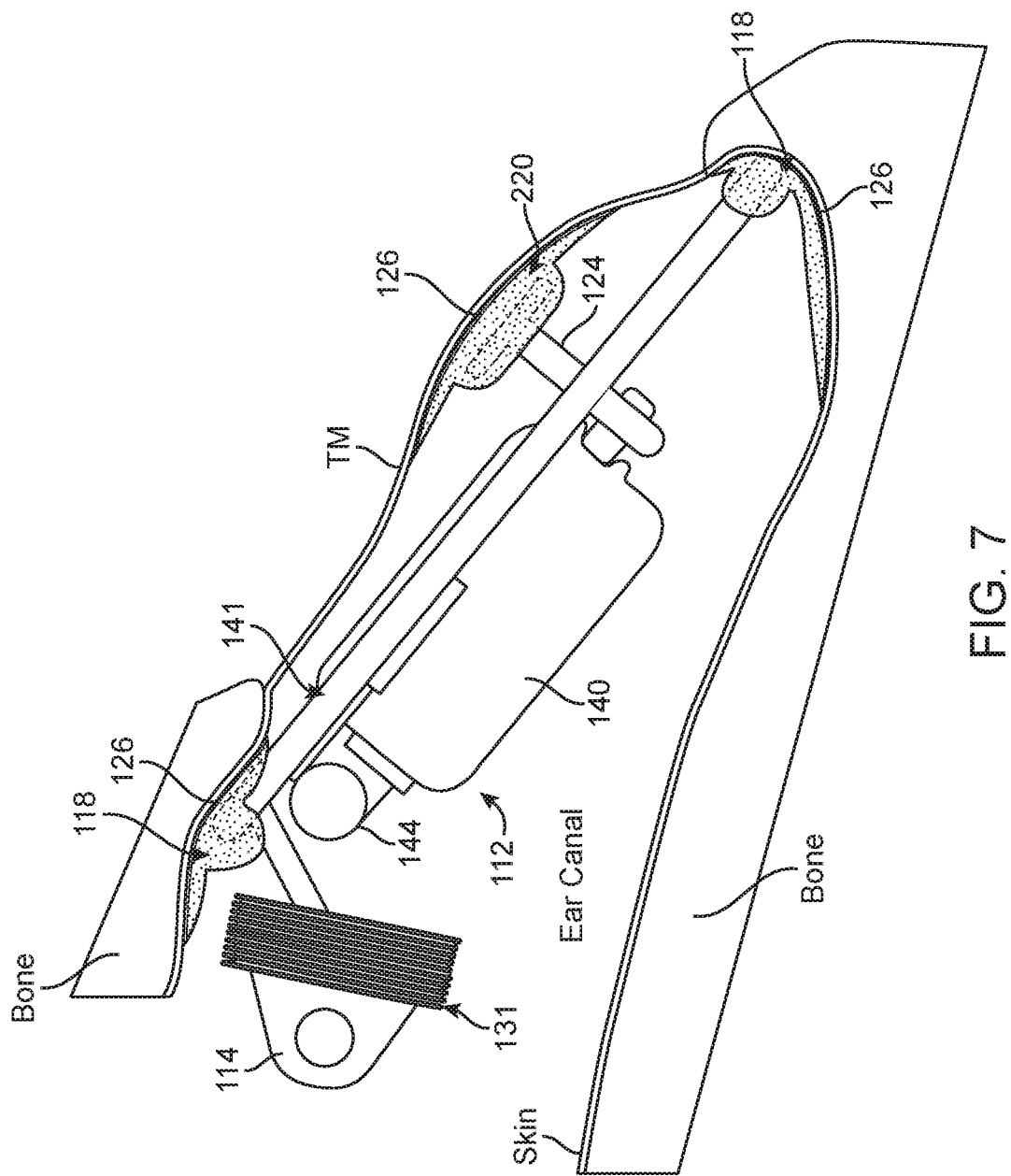
FIG. 7 is a cutaway view of an ear canal illustrating the positioning of an inductively coupled contact hearing device for use in systems and methods according to the present invention.

FIG. 7 is a cutaway view of an ear canal illustrating the positioning of a contact hearing device 112 according to the present invention. In the embodiment of FIG. 7, contact hearing device 112 is positioned at a medial end of the ear canal, proximate the tympanic membrane of the user. Contact hearing device 112 includes a receive coil 131 positioned at a medial end thereof. In embodiments of the invention, receive coil 131 may be positioned to receive signals from an ear tip (not shown) positioned in the ear canal lateral to the position of contact hearing device 112. In embodiments of the invention, signals received by receive coil 131 may be transmitted to microactuator 140 to move drive post 124 which is connected to the user's tympanic membrane through umbo lens 220. Umbo lens 220 may be in direct physical contact with the tympanic membrane or a thin layer of oil 126 may be used between umbo lens 220 and the user's tympanic membrane. Sulcus platform 118 may be used to properly position contact hearing device 112 in the user's ear canal through contact with a skin layer which lines the ear canal. Sulcus platform 118 may be in direct contact with the skin of the ear canal or a thin layer of oil 126 may be used between sulcus platform 118 and the skin of the ear canal. In embodiments of the invention, contact hearing device 112 may further include support structure 141, grasping tab 114 and springs 144.

Figure 8:
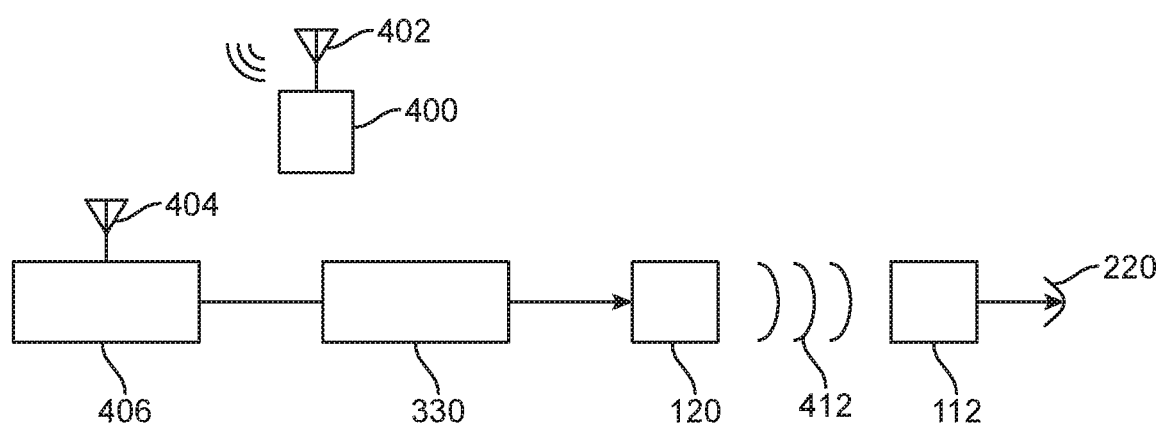
FIG. 8 is a system wherein a data transmission device (e.g., a cell phone) is transmitting a data stream to a contact hearing system including an ear tip and a contact hearing device according to the present invention.

FIG. 8 is a system wherein a data transmission device such as a cell phone is transmitting a data stream to a contact hearing system including an ear tip and a contact hearing device according to the present invention. In FIG. 8, data transmission device 400 includes a data transmission antenna 402 from which data, such as streaming audio, may be transmitted to a receiver antenna 404 which is connected to receiver 406. The output of receiver 406 may be transmitted to signal processor 330. Signal processor 330 may include a sampling rate converter and a digital signal processor. The output of signal processor 330 may be transmitted to ear tip 120 which may transmit the output of signal processor 330 via transmitted signal 412. Transmitted signal 412 may comprise light pulses or other electromagnetic waves, including radio waves and inductively coupled waves. Transmitted signal 412 may be received by contact hearing device 112 and converted to mechanical energy to drive a tympanic membrane through, for example, umbo lens 220.

Figure 9:
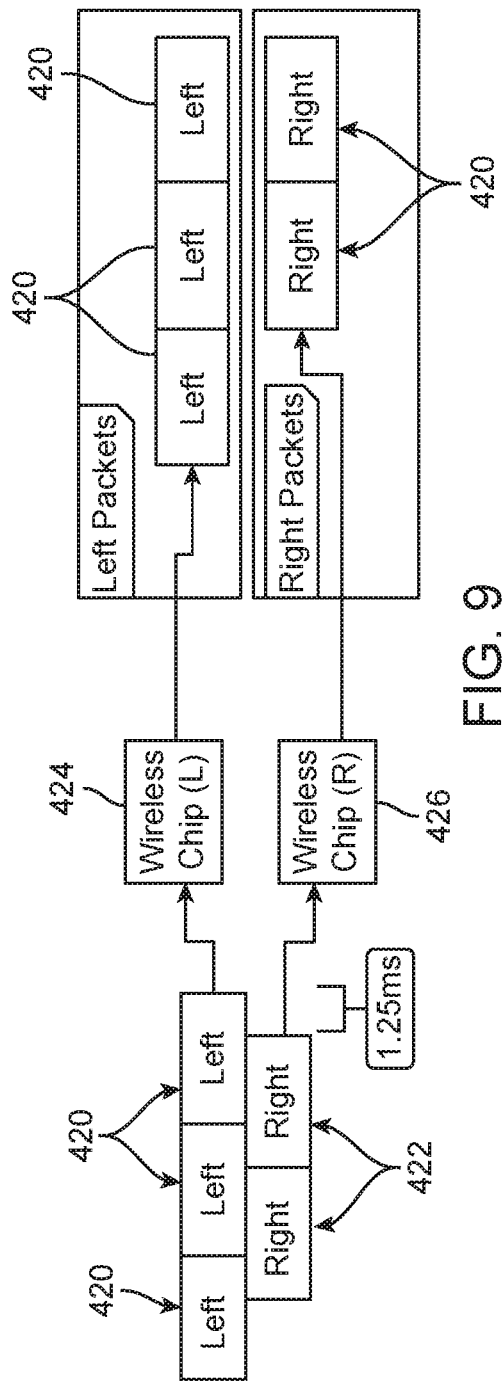
FIG. 9 is a block diagram illustrating the transmission and handling of data packets in systems and methods according to the present invention.

FIG. 9 is a block diagram illustrating the transmission and handling of data packets in systems and methods according to the present invention. In FIG. 9, Left data transmission packets 420 and right data transmission packets 422 are transmitted from data transmission device 400 in a predetermined sequence and with a predetermined timing. Upon receipt by receiver 406, left data transmission packets 420 and right data protection packets may be temporally aligned by including appropriate delays in left wireless chip 424 or right wireless chip 426.

Figure 9A:
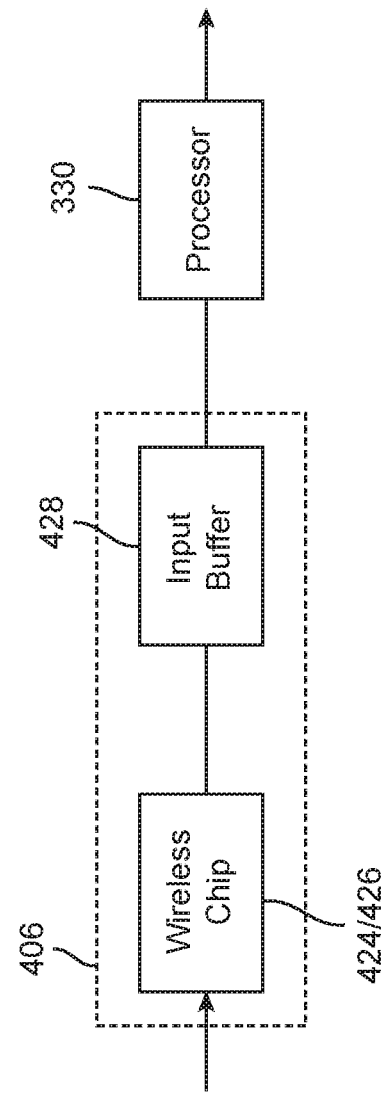
FIG. 9A is a block diagram of circuitry for use in systems and methods according to the present invention.

FIG. 9A is a block diagram of a wireless chip for use in systems and methods according to the present invention. In FIG. 9A, receiver 406 includes wireless chip 424 for a first (e.g. left) hearing aid and wireless chip 426 for a second (e.g. right) hearing aid. Wireless chip 424 may also include input buffer 428 (which may be a data buffer). The output of input buffer 428 may be connected to signal processor 330.

Figure 10:
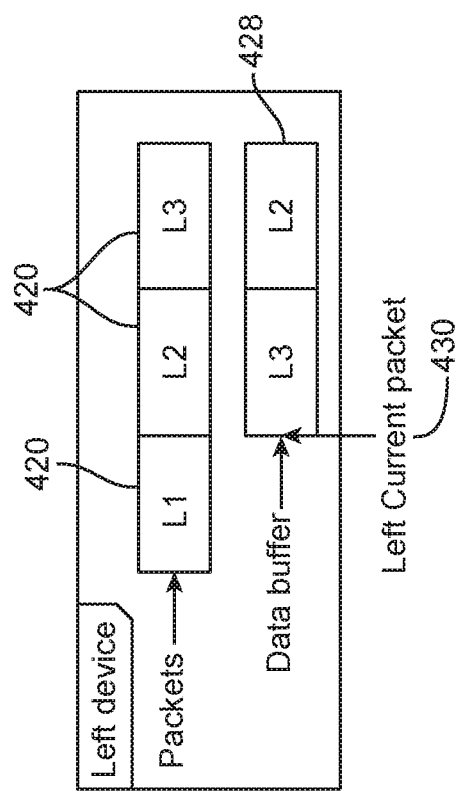
FIG. 10 is a block diagram illustrating the handling of data packets according to the present invention in a left hearing aid device.
Figure 11:
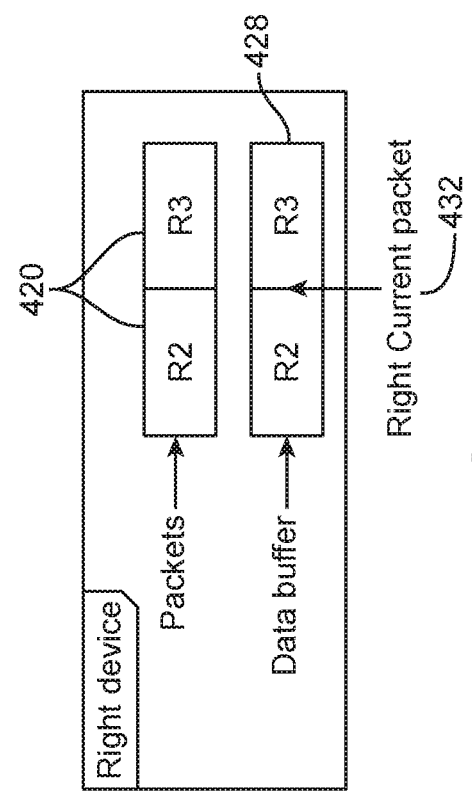
FIG. 11 is a block diagram illustrating the handling of data packets in a right hearing aid according to the present invention.

FIG. 10 is a block diagram illustrating the handling of data packets according to the present invention in a first (e.g. left) hearing aid. In FIG. 10, left data transmission packets 420 are arranged in an input buffer 428 in the first hearing aid according to the position of left current packet indicator 430. FIG. 11 is a block diagram illustrating the handling of data packets in a second (e.g. right) hearing aid according to the present invention. In FIG. 11, right data transmission packets 420 are arranged in an input buffer 428 in the second hearing aid according to the position of right current packet indicator 432.

Figure 12:
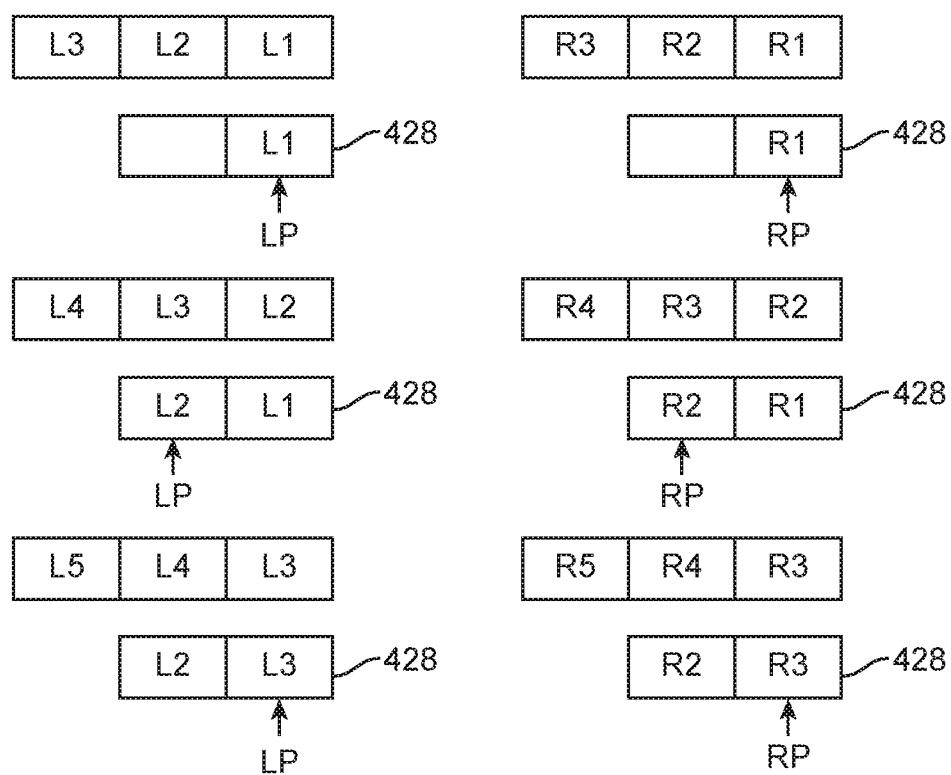
FIG. 12 is a block diagram illustrating a method of handling data packets in a hearing aid.

FIG. 12 is a block diagram illustrating a method of handling data packets in a hearing aid. In FIG. 12, left data packets L1, L2 and L3 are loaded into an input buffer 428 in a left hearing aid as they are received, with the left current buffer pointer LP indicating the buffer position in the buffer in the left hearing aid into which the next left data packet is to be loaded. Also in FIG. 12, right data packets R1, R2 and R3 are loaded into an input buffer 428 in a right hearing aid as they are received, with the right current buffer pointer RP indicating the buffer position in the buffer in the right hearing aid into which the next right data packet is to be loaded.

Figure 13:
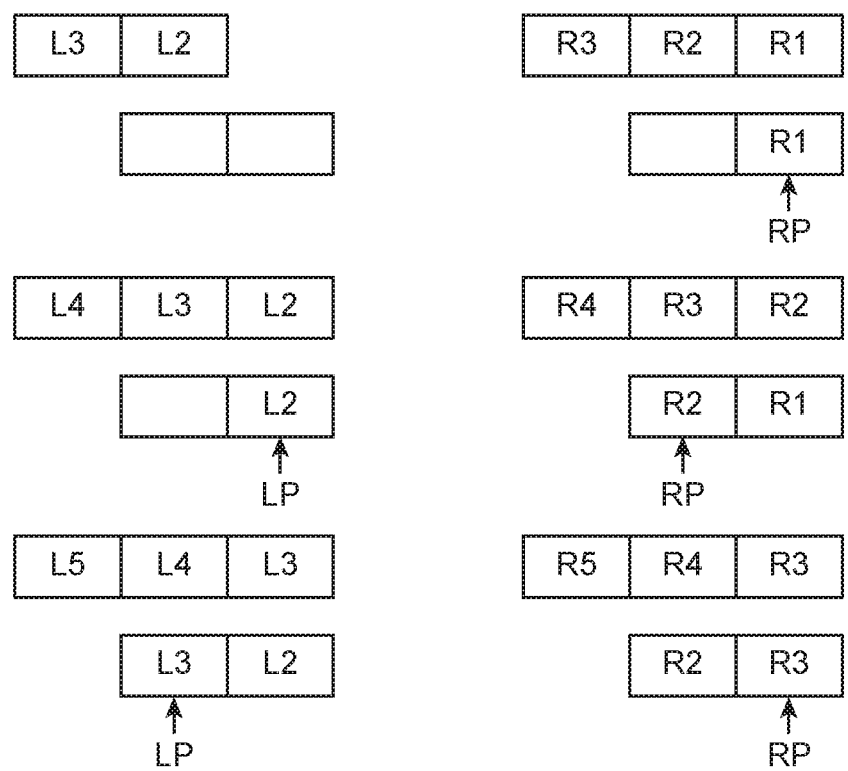
FIG. 13 is a block diagram illustrating a method of compensating for missing data packets according to the present invention.

FIG. 13 is a block diagram illustrating a method of compensating for missing data packets according to the present invention. In FIG. 13, as in FIG. 12, left data packets L1, L2 and L3 are loaded into an input buffer 428 in a left hearing aid as they are received, with the left current buffer pointer LP indicating the buffer position in the buffer in the left hearing aid into which the next left data packet is to be loaded. Also in FIG. 12, right data packets R1, R2 and R3 are loaded into an input buffer 428 in a right hearing aid as they are received, with the right current buffer pointer RP indicating the buffer position in the buffer in the right hearing aid into which the next right data packet is to be loaded. In the embodiment of FIG. 13, the current data buffer pointer for a data buffer position is only moved when new data is received, it is not automatically updated. In the embodiment of FIG. 13 data in a buffer position currently identified by a data pointer is overwritten when new data arrives.

Figure 14:
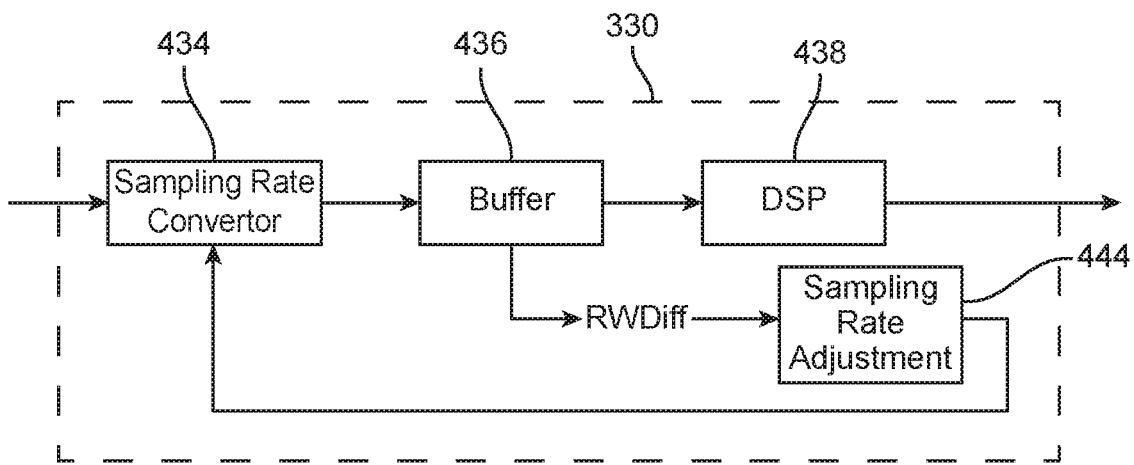
FIG. 14 is a block diagram of a system for compensating for differences in sampling rates in a system according to the present invention.

FIG. 14 is a block diagram of a circuit for compensating for differences in sampling rates in a system according to the present invention. In FIG. 14, signal processor 330 includes sampling rate converter 434, converter output buffer 436, digital signal processor 438 and sampling rate adjustment circuitry 444. In embodiments of the invention, sampling rate converter 434 receives data packets having a first sampling rate and converts the data into data having a second sampling rate which makes the data usable by the digital signal processor. The converted data is then placed in converter output buffer 436 where it may be read by digital signal processor 438. Converter output buffer 436 may generate an error signal RWDiff, which may be used by sampling rate adjustment circuitry 444 to generate a signal which is fed back to sampling rate converter 434 to modify the second sampling rate in order to maintain the RWDiff feedback signal at or near a predetermined value. In embodiments of the invention, it may be desirable to maintain RWDiff at a value which is equal half the size of converter output buffer 436.

Figure 14A:
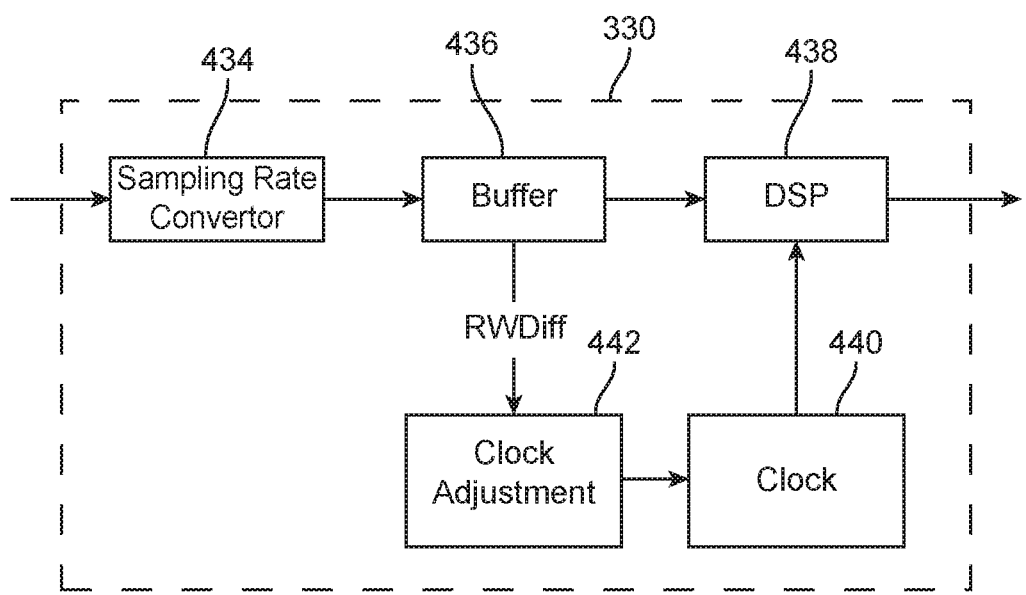
FIG. 14A is a block diagram of a system for compensating for differences in clock rates in a system according to the present invention.

FIG. 14A is a block diagram of a system for compensating for differences in clock rates in a system according to the present invention. In FIG. 14A, signal processor 330 includes sampling rate converter 434, converter output buffer 436, digital signal processor 438, clock 440 and clock adjustment circuitry 442. In embodiments of the invention, sampling rate converter 434 receives data packets having a first sampling rate and converts the data into data having a second sampling rate which makes the data usable by the digital signal processor. The converted data is then placed in converter output buffer 436 where it may be read by digital signal processor 438. Converter output buffer 436 may generate an error signal RWDiff, which may be used by clock adjustment circuitry 442 to generate a signal which is fed back to clock to modify the rate at which digital signal processor 438 reads data from converter output buffer 436 in order to ensure that the read rate of digital signal processor 438 is consistent with the second sampling rate in order to maintain the RWDiff feedback signal at or near a predetermined value. In embodiments of the invention, it may be desirable to maintain RWDiff at a value which is equal half the size of converter output buffer 436.

Figure 15:
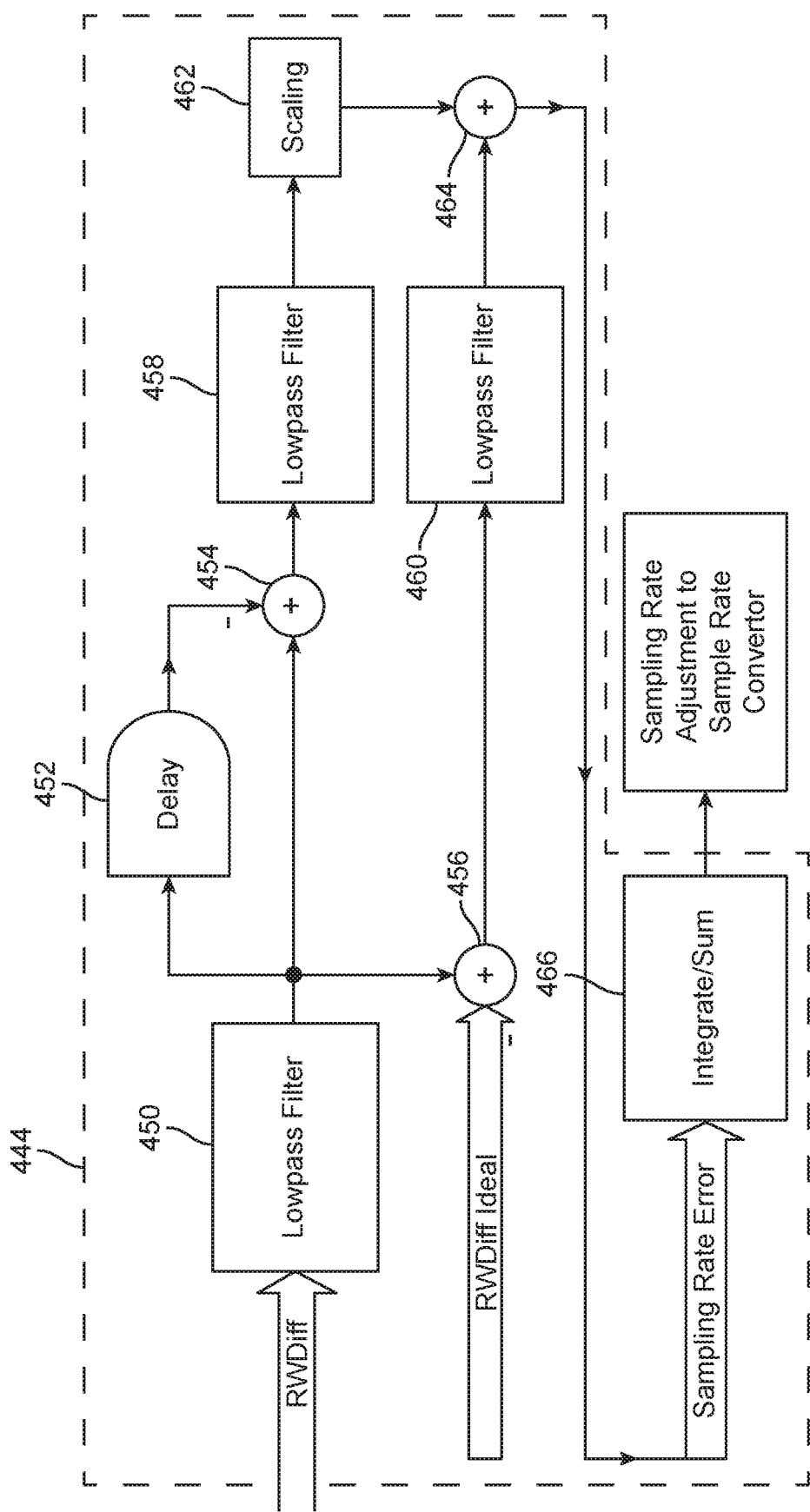
FIG. 15 is a block diagram of a control system for use in compensating for differences in sampling rates in a system according to the present invention.

FIG. 15 is a block diagram of a control system for use in compensating for differences in sampling rates in a system according to the present invention. In FIG. 15, sampling rate adjustment circuitry 444 (which may also be implemented in software) includes lowpass filter 450, delay circuit 452, summing circuit 454, lowpass filter 458, lowpass filter 460, scaling circuit 462, summing circuit 464 and integrate and sum circuit 466. In embodiments of the invention RWDiff signal is received by sampling rate adjustment circuitry 444 and processed by lowpass filter 450, the output of lowpass filter 450 is sent to delay circuitry 452, summing circuit 456 and summing circuit 454. The output of delay circuit 452 is thereafter subtracted from the output of lowpass filter 450 in summing circuit 454 and the output of summing circuit 454 is passed to lowpass filter 458. The output of lowpass filter 458 is passed to scaling circuit 462. The output of scaling circuit 462 is summed with the output of lowpass filter 460 in summing circuit 464. The input of lowpass filter 460 is the output of summing circuit 456, which sums the output of lowpass filter 450 with a predetermined value (RWDiff Ideal or RWIdeal) representative of the ideal value for RWDiff. The output of summing circuit 464 is the sampling rate error, which is the input to integrate and sum circuit 466. The output of integrate and sum circuit 466 is the sampling rate adjustment, which may be used to adjust the sampling rate in sampling rate converter 434.

Figure 15A:
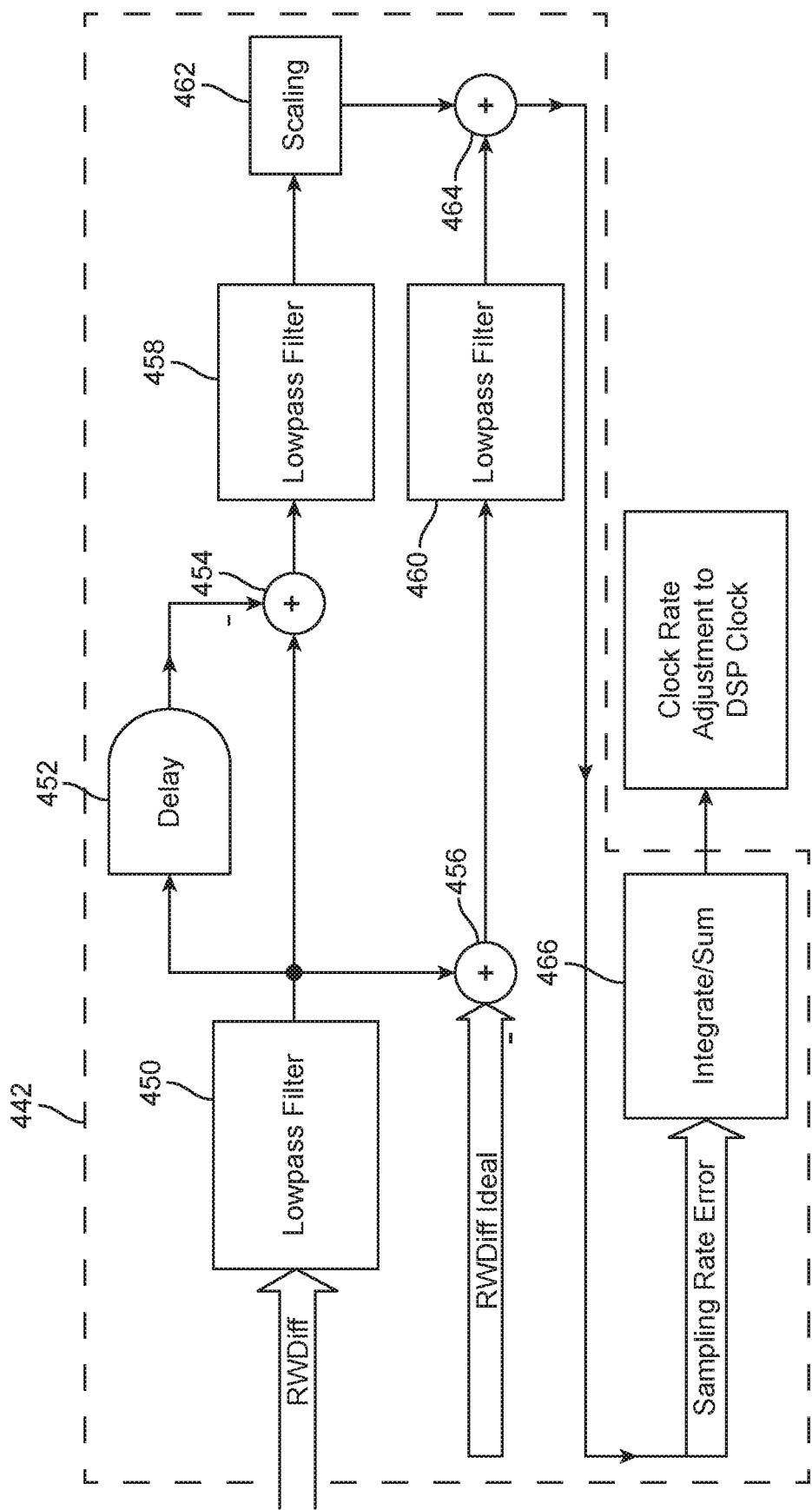
FIG. 15A is a block diagram of a control system for use in compensating for differences in clock rates in a system according to the present invention.

FIG. 15A is a block diagram of a control system for use in compensating for differences in clock rates in a system according to the present invention. In FIG. 15A, clock adjustment circuitry 442 (which may also be implemented in software) includes lowpass filter 450, delay circuit 452, summing circuit 454, lowpass filter 458, lowpass filter 460, scaling circuit 462, summing circuit 464, integrate and sum circuit 466. In embodiments of the invention, RWDiff signal is received by sampling rate adjustment circuitry 444 and processed by lowpass filter 450, the output of lowpass filter 450 is sent to delay circuitry 452, summing circuit 456 and summing circuit 454. The output of delay circuit 452 is thereafter subtracted from the output of lowpass filter 450 in summing circuit 454 and the output of summing circuit 454 is passed to lowpass filter 458. The output of lowpass filter 458 is passed to scaling circuit 462. The output of scaling circuit 462 is summed with the output of lowpass filter 460 in summing circuit 464. The input of lowpass filter 460 is the output of summing circuit 456, which sums the output of lowpass filter 450 with a predetermined value (RWDiff Ideal) representative of the ideal value for RWDiff. The output of summing circuit 464 is the sampling rate error, which is the input to integrate and sum circuit 466. The output of integrate and sum circuit 466 is the clock rate adjustment, which may be used to adjust the clock rate in clock 440, which controls the clock for digital signal processor 438. In this embodiment, control of the clock for the digital signal processor controls the rate at which the digital signal processor reads data from the sampling rate output buffer to match that rate at which the sampling rate converter writes data to the sampling rate converter output buffer.

Figure 16:
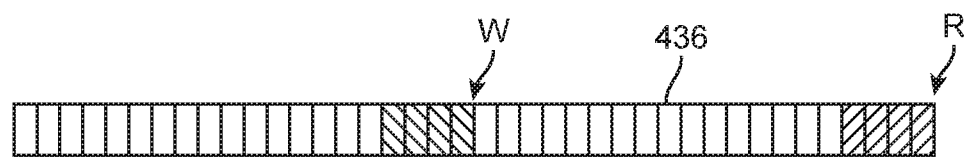
FIG. 16 is an illustration of how synchronized data moves through a converter output buffer.

FIG. 16 is an illustration of how synchronized data moves through a converter output buffer. In FIG. 16, data moving through converter output buffer 436 is synchronized such that as data is read from converter output buffer by the digital signal processor, new data is written to converter output buffer 436 by the sampling rate converter 434. Thus, in this case, the value RWDiff is equal to the value RWDiff Ideal.

Figure 17:
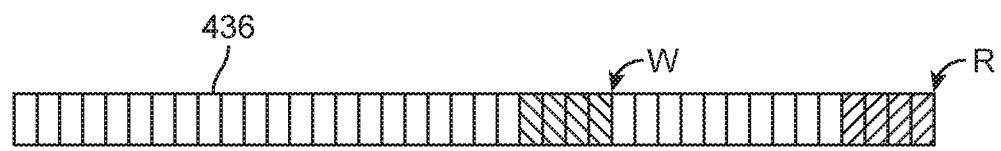
FIG. 17 is an illustration of how unsynchronized data sampled at a first sampling rate moves through a converter output buffer.

FIG. 17 is an illustration of how unsynchronized data sampled at a first sampling rate moves through a converter output buffer. In FIG. 17, data moving through converter output buffer 436 is not synchronized and data is being written to converter output buffer 436 by the sampling rate converter faster than it is being read from converter output buffer 436 by the digital signal processor. Thus, in this case, the value of RWDiff is less than the value of RWDiff Ideal.

Figure 18:
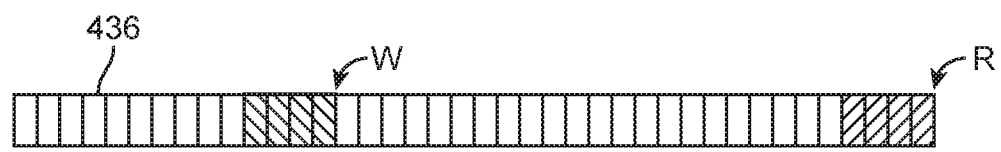
FIG. 18 is an illustration of how unsynchronized data sampled at a second sampling rate moves through a converter output buffer.

FIG. 18 is an illustration of how unsynchronized data sampled at a second sampling rate moves through a converter output buffer. In FIG. 18, data moving through converter output buffer 436 is not synchronized and data is being read from converter output buffer 436 by the digital signal processor faster than it can be written to converter output buffer 436 by the sampling rate converter. Thus, in this case, the value of RWDiff is greater than the value of RWDiff Ideal.

As illustrated in FIG. 9, the issues described above with respect to the receipt of time separated data packets for each ear may be solved by delaying the first packet received for a predetermined period (e.g., 1.25 milliseconds). The first packet may be identified by a preamble in the data stream which indicates whether the left or the right data packet was the first one sent. Thus, if the right data packet is the first one sent, the right hearing aid will delay the use of that data packet, and all subsequent data packets, for the predetermined period to ensure that the right and left hearing aids are processing corresponding data packets at the same time. Unfortunately, any synchronization created by adding the delay mentioned above will be disrupted by the loss of a data packet. Lost data packets will result in the data being processed in one hearing aid being different from the data being processed in the other hearing aid, resulting in a lack of synchronization.

As illustrated in FIGS. 10, 11, and 12, in systems where the hearing aids use a two data packet receive buffer to receive data, each data packet is placed into one of the two buffer slots as it is received and the oldest data packet in the receive buffer is overwritten, having been transferred to the rate matching circuitry for processing. Thus, if there are no lost data packets and the proper delay is utilized, and, for the purpose of this analysis, assuming that the right packet arrives first, the right hearing aid will take the first right data packet from slot one of the right receive buffer at the same time as the left hearing aid takes the left packet from slot one of the left receive buffer. In this case, the current buffer pointer points to slot one of both the left and right receive buffers. The data in the receive buffer slot may then be read by the sampling rate converter. As the next data packet arrives, the second slot in the receive buffers will be filled by the second data packets and, once the data packets in the first slot in the receive buffers have been read by the sampling rate converter, the current buffer pointer moves to the second slot in the receive buffer and the data packets located there are read by the sampling rate converter. As the next data packets arrive, the first slot in the input data buffers will be filled by those data packets, overwriting the first data packets, and, once the data in the second slots of the receive data buffers are read and utilized, the current buffer pointer moves back to the first slot of the input data buffer. It will be understood that the present algorithm may apply to receive buffers having more than two slots for data packets and that the two data packet receive buffer described was described for the purposes of illustration.

As long as there are no lost data packets, the sequence described above will continue for as long as data is being received by the hearing aids, ensuring that the left and right hearing aids are utilizing corresponding data packets at the same time and keeping them in synch. However, in the event that a data packet is lost, the sequence above will result in the hearing aids processing mismatched data packets. For example, if the second right data packet is lost, the right hearing aid will be utilizing the third right data packet at the time the left hearing aid is utilizing the second left data packet and the sound provided to the user will no longer be synchronized.

As illustrated in FIG. 13, this problem may be overcome by moving the current buffer pointer to the most recently received data packet in the input data buffer, rather than moving it to the next buffer position each time a new data packet is utilized. In embodiments of the invention, logic may be added to manage the input buffer for the sampling rate converter, wherein the added logic ensures that the sampling rate converter begins processing samples in a deterministic way, so that each hearing aid in a pair may operate independently but always remain synchronized to the Bluetooth data being received by the hearing aids. In embodiments of the invention, the packets from a decoder are written to an intermediate buffer, and the most recently written packet is always the one read from the intermediate buffer to the sampling rate converter input buffer. This ensures that both devices are copying the same packet. Additionally, the sampling rate converter input buffer is always filled with the very first sample of a packet to ensure both hearing aids's sampling rate converter buffers are filled with the same samples within the packet.

The synchronization issues described herein may be addressed by write rate matching or read rate matching in the converter output buffer wherein control is achieved by optimizing the difference between the read pointer and the write pointer in the converter output buffer ("RWDiff"). The circuits described and illustrated with respect to FIGS. 14, 14A, 15 and 15A may be used to implement the algorithm described herein. The function of the circuits and circuit components illustrated in FIGS. 14, 14A, 15 and 15A may be implanted in software, hardware or a combination of the two. This optimization of RWDiff may be achieved by controlling the rate at which data is written to the converter output buffer to match the rate at which data is taken from the converter output buffer by the digital signal processor ("write rate matching"). Alternatively, RWDiff may be optimized by controlling the clock which is used by the digital signal processor to control the rate at which data is read from the converter output buffer to match the rate at which data is written to the converter output buffer by the sampling rate converter ("read rate matching"). In write rate matching, the write rate to the sampling rate converter is controlled by controlling the rate matching while in read rate matching the read rate of the digital signal processor is controlled by controlling the digital signal processor clock.

In the rate matching algorithm described herein, the hearing aid initially assumes that that sampling rate of received data is the sampling rate for the sending device (e.g., 16 KHz for data transmitted from a cell phone such as an iPhone) and converts to the sampling rate to match the rate at which hearing aid digital signal processor processes data. As an initial condition the rate matching algorithm assumes that the digital signal processor is taking samples at a rate which is the specified rate for digital signal processor Chip of that type (e.g., 24.6 KHz). In the event that the digital signal processor is operating at the specified rate, the rate matching algorithm will not have to make any additional adjustments. However, if the digital signal processor chip is not operating at its specified sampling rate (e.g. it is operating at 24.59 KHz or 24.61 KHz in a digital signal processor specked at 24.6 KHz) the rate matching algorithm will need to adjust the sampling rate it is using to ensure that the sampling rate of the data coming out of the sampling rate converter is matched to the sampling rate being used by the digital signal processor. If the sampling rate used by the rate matching algorithm is higher than the sampling rate of the digital signal processor then data will be written to the converter output buffer faster than the digital signal processor takes data from the converter output buffer (which may be a circular buffer) and, eventually, data will be overwritten by the sampling rate converter before it can be read by the digital signal processor. In the alternative, if the sampling rate used by the rate matching algorithm is lower than the sampling rate of the digital signal processor, the digital signal processor will eventually try to read data that has not yet been written to the converter output buffer and will receive invalid data.

The rate matching algorithm is designed to avoid these issues by calculating how quickly the digital signal processor is requesting samples from the converter output buffer and utilizing that calculation to adjust the sampling rate that the sampling rate converter uses to match the sampling rate of the digital signal processor. In practice, the digital signal processor processes the data samples in blocks. When the digital signal processor finishes processing a batch of samples it will ask for more samples from the converter output buffer. The frequency of that request over time is a rough estimate of the actual sampling rate. In order to determine the actual digital signal processor sampling rate, the sampling rate converter starts out assuming that the digital signal processor is operating at the specified rate for digital signal processors of that type (e.g., 24.6 KHz). If the assumed digital signal processor sampling rate is correct, then the converter output buffer will be loaded at the same rate data is requested and transmitted to the digital signal processor. If the assumed sample rate is higher than the actual sampling rate of the digital signal processor, the converter output buffer will be filled faster than data is requested by the digital signal processor, which will eventually lead to a situation where the sampling rate converter writes new data over unread data in the converter output buffer. If the assumed sampling rate is lower than the actual sampling rate of the digital signal processor, then the data will be loaded in the converter output buffer at a rate that is slower than it is requested by the digital signal processor, ultimately leading to a situation where the digital signal processor requests data before new data has been loaded into the converter output buffer and the data received by the digital signal processor as a result of that request will be invalid. Therefore, the sample rate converter must match the rate at which the digital signal processor picks up the samples with the rate at which the samples are produced by the rate matching algorithm. The algorithm may, therefore, be designed to track the rate at which samples are being read from the buffer and calculate adjustments to that rate for use in the rate sampling algorithm.

The alignment of the sampling rates used by the sampling rate converter and the digital signal processor has an additional benefit. When the sampling rates in the sampling rate algorithm and the digital signal processor are aligned in both hearing aids (even if the digital signal processor sampling rates are different in each ear) the data processed in both hearing aids will be very close to being in sync and any differences should be imperceptible to the user. As long as the sampling rate is correct for each ear the digital signal processor will get the correct data at the correct time and the individual hearing aids will, for all practical purposes be fully synchronized. Therefore, the user should not perceive any difference in the sound.

In an algorithm according to the present invention, the input to the algorithm is the variable RWDiff, which is the difference between the read pointer and the write pointer in the converter output buffer. Ideally, the rate matching algorithm would maintain the difference between write and read pointers at a fixed distance, which is a function of the size of the converter output buffer. In an ideal situation the two pointers would be separated by a fixed distance (e.g., a half a buffer). For example, if the converter output buffer had slots for 100 data packets, the ideal RWDiff (RWDiff Ideal) would be 50. However, in actual practice, the difference increases and decreases according to the sampling rate used by the digital signal processor. In practice, the rate matching algorithm can measure the actual difference between the read and write pointers in the converter output buffer and generate the error RWDiff which is the input to a control algorithm (e.g., a PID control algorithm) which is used to generate a sampling rate adjustment.

In practice, an increased sampling rate in the sampling rate converter will result in more samples being added to the buffer over time. If the digital signal processor is unable to keep up, the buffer will fill up and the RWDiff will decrease below the RWDiff Ideal, causing the control algorithm to lower the sampling rate used in the sampling rate converter. The lowered sampling rate will result in fewer samples being added to the converter output buffer. If the sampling rate becomes too low, the RWDiff will increase above the RWDiff Ideal and the control algorithm will need to increase the sampling rate to allow the sampling rate converter to catch up with the demand from the digital signal processor.

In one situation, the converter output buffer may be designed to hold 200 samples. In this design, the RWDiff ideal would be 100. If the actual RWDiff exceeded 100, the algorithm would increase the sampling rate in the sampling rate converter until the actual RWDiff was approximately 100. If the actual RWDiff was less than 100, the algorithm would decrease the sampling rate in the sampling rate converter until the actual RWDiff was approximately 100. In some designs the digital signal processor would take 16 samples at a time. Once those 16 samples have been read, the read pointer moves to the next samples to be read.

In embodiments of the invention, the solution described herein may be based on the assumption that the Bluetooth data sent to each hearing aid arrives at the same time, or close enough to be imperceptible or that data arriving at a first hearing aid is offset in time by a predetermined amount and the delay is compensated for by the hearing aids. Under this assumption, if the rate matching algorithm modulates the resampling ratio to match to the device's actual sampling rate, then the audio output of each device will be time-aligned as well as the Bluetooth data, even if each device's sampling rate is different. The rate matching algorithm described herein will, therefore, allow the hearing aid to track the actual sampling rate closely enough that the time-alignment differences between each device's output are imperceptible to the user.

In one embodiment of the invention, a rate matching algorithm takes two inputs. The first input or RWDiff may be the difference between the read and write pointers to the sample rate converter (SRC) output buffer. A digital signal processor consumes (reads) samples from this converter output buffer, and the sample rate converter feeds (writes) samples to the buffer. The second input or RWDiff Ideal is the ideal value of the read-write pointer difference, which may be, for example half the converter output buffer size. Rather than simply using the value of RWDiff itself to indicate the correction, a rate matching algorithm according to the present invention estimates the rate of change of RWDiff using a smoothed difference between previous and current values. The rate of change of RWDiff is more useful because it indicates the difference between the current sampling rate of the sampling rate converter and the actual device sampling rate, therefore, it is the difference between the rate of reading and the rate of writing samples to the buffer. This smoothed difference is calculated every block of sampling rate converter input samples, so it is scaled to convert it into samples per second. This scaled result is the read rate minus the write rate.

In embodiments of the invention, an additional term is added to the estimate, which is the difference between the smoothed value of RWDiff and RWDiff Ideal, smoothed in time by a lowpass filter. This ensures that even as the rate of change of RWDiff goes to zero, RWDiff itself approaches its ideal value, minimizing the risk of buffer overflow or underflow. For example, if RWDiff is above its ideal value, the estimate of the sampling rate error is made more positive, indicating that the read rate is faster than the write rate. To compensate, the sampling rate converter will increase its target sampling rate (writing rate) so that the difference between the read and write pointers decreases over time. By keeping RWDiff close to RWDiff Ideal, we also ensure that the throughput delay of the SRC is the same on a pair of devices, since the read pointer is the same number of samples behind the write pointer. The resulting error is accumulated over time and fed to the sampling rate converter to adjust the sampling rate.

Synchronization problems may also be addressed by using the output of the rate control algorithm to control the clock utilized by the digital signal processor. Since changes to that clock will change the rate at which data is read from the converter output buffer, the clock may be adjusted to optimize RWDiff by matching the rate at which data is read from the converter output buffer to the rate at which data is read to the converter output buffer by the sampling rate converter. In practice, the clock on the data streaming device (e.g., iPhone) will be more stable than the clock used by the digital signal processor on the hearing aid and using the RWDiff to control the digital signal processor clock will enable the hearing aid to optimize RWDiff and, in doing do, optimize synchronization between hearing aids in a set since they will both be essentially working off of the data streaming device clock.

One benefit of the synchronization techniques described herein is that the independent implementation of these techniques in individual hearing aids in a set will ensure that the sound coming out of the first hearing aid is synchronized with the sound coming out of the second hearing aid event though there is no communication between the hearing aids and the synchronization algorithms are working independently. The optimization of RWDiff in both hearing aids will result in synchronization between the hearing aids. This result occurs because RWDiff is being optimized in both hearing aids based upon data provided by the same remote data streaming device, which data is synchronized as it is transmitted. The hearing aids are synchronized independently but deterministically and are, therefore, in synch.

In embodiments of the invention, the buffer management described here combined with the rate matching algorithm described herein allow time-aligned output of independent Bluetooth devices, without cross-communication. In addition to its use in hearing aids, the inventions described herein may be useful for any pair of wireless audio devices that use a wireless protocol with similar clock accuracy to Bluetooth.

Embodiments of the present invention are directed to hearing aid systems wherein a data streaming device streams packets of data to at least two hearing aids and more particularly to a method of compensating for lost data packets including the steps of: receiving a first data stream comprising a first series of data packets at a first hearing aid; receiving a second data stream comprising a second series of data packets at a second hearing aid wherein receipt of the second data stream is delayed in time from receipt of the first data stream; delaying use of the first data stream by the first hearing aid for a predetermined period of time; receiving a first data packet; writing the first data packet in the first data steam to a first location in a data input buffer in the first hearing aid; writing the first data packet in the second data stream to a first location in a data input buffer in the second hearing aid; writing the second data packet in the first data stream to a second location in a data input buffer in the first hearing aid; writing the second data packet in the second data stream to a second location in a data input buffer in the second hearing aid; establishing the buffer location in the first hearing aid data buffer which includes the next data packet to be read by reference to a first read indicator which points to the correct location in the data buffer; establishing the buffer location in the second hearing aid data buffer which includes the next data packet to be read by reference to a second read indicator which points to the correct location in the data buffer; reading the information in the buffer indicated by the first read indicator; reading the information in the buffer indicated by the second read indicator; moving the first read indicator to the next hearing aid data buffer when the buffer is loaded with new data; and moving the second read indicator to the next hearing aid data buffer when the buffer is loaded with new data. In embodiments of the invention, the first read indicator is not moved if no new data is loaded into the buffer. In embodiments of the invention, the first data stream is delayed for a predetermined period equal to the delay time of the second data stream. In embodiments of the invention, the first data stream is delayed for a predetermined period such that the difference between the predetermined period and the delay time of the second data stream is less than 0.1 seconds. In embodiments of the invention, the first data stream is delayed for a predetermined period such that the difference between the predetermined period and the delay time of the second data stream is less than 0.5 seconds. In embodiments of the invention, the first data packet includes an identifier indicating that the first data packet is the first packet in a data string for a first hearing aid.

Embodiments of the present invention are directed to a hearing aid system wherein a data streaming device streams data to a hearing aid, the system comprising: a hearing aid adapted to receive data from a data transmission device, wherein the data received by the hearing aid has a first sampling rate; a sampling rate converter in the hearing aid, wherein the sampling rate converter is adapted to convert the sampling rate of the received data to a sampling rate suitable for use by digital signal processing circuitry in the hearing aid; a buffer adapted to receive data from the sampling rate converter; an RWDiff signal which indicates the difference between the rate at which data is read from and written to the buffer; and a control circuit which compares the RWDiff signal to a predetermined RWIdeal quantity and generates an adjustment signal. In embodiments of the invention, the adjustment signal is fed back to the sampling rate converter. In embodiments of the invention, the adjustment signal is fed back to the clock which controls the digital signal processor. In embodiments of the invention, the control circuit includes a lowpass filter and a PID controller. In embodiments of the invention, the adjustment signal is the output of the PID controller. In embodiments of the invention the input to the lowpass filter is the RWDiff signal.

Embodiments of the present invention are directed to a hearing aid system wherein a data streaming device streams data to a hearing aid, the system comprising: a hearing aid adapted to receive data from a data transmission device, wherein the data received by the hearing aid has a first sampling rate; a buffer adapted to receive data from the data transmission device; an RWDiff signal which indicates the difference between the rate at which data is read from and written to the buffer; and a control circuit which compares the RWDiff signal to a predetermined RWIdeal quantity and generates an adjustment signal. In embodiments of the invention, the adjustment signal is fed back to the clock which controls the digital signal processor. In embodiments of the invention, the control circuit includes a lowpass filter and a PID controller. In embodiments of the invention, the adjustment signal is the output of the PID controller. In embodiments of the invention, the input to the lowpass filter is the RWDiff signal.

Embodiments of the invention are directed to a method of maintaining synchronization when converting a sampling rate in a hearing aid, the method comprising the steps of: receiving data from a data transmission device wherein the received data has a first sampling rate; converting the received data from a the first sampling rate to a second sampling rate, wherein the second sampling rate is a sampling rate usable in digital signal processing circuitry in the hearing aid; transmitting the received data to a buffer which holds the received data until it is read by the digital signal processing circuitry; calculating a RWDiff signal which is a function of the difference between the rate at which date is written to the buffer and the rate at which data is read from the buffer; using the RWDiff signal to modify the rate at which date is either written to or read from the buffer. In embodiments of the invention, the step of using the RWDiff signal to modify the first sampling rate. In embodiments of a method according to the present invention, the method further includes the steps of: comparing the RWDiff signal to an RWIdeal quantity, wherein RWIdeal represents an ideal difference between the rate at which data is read from and the rate at which data is written to the buffer; and generating a signal which modifies the sampling rate used in the sampling rate converter as a function of the difference between RWDiff and RWIdeal. In embodiments of a method, according to the present invention, the method further includes the step of feeding the RWDiff signal into a lowpass filter and feeding the output of the lowpass filter into a PID control circuit. In embodiments of the present invention, the sampling rate used in the sampling rate converter is modified in a manner which minimizes the difference between RWDiff and RWIdeal. In embodiments of the present invention, the RWDiff signal is used to modify a clock rate used in the digital signal processing circuitry. In embodiments of the present invention, the clock rate used in the digital signal processor is modified in a manner which minimizes the difference between RWDiff and RWIdeal.

While the preferred embodiments of the devices and methods have been described in reference to the environment in which they were developed, they are merely illustrative of the principles of the present inventive concepts. Modification or combinations of the above-described assemblies, other embodiments, configurations, and methods for carrying out the invention, and variations of aspects of the invention that are obvious to those of skill in the art are intended to be within the scope of the claims. In addition, where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claim.

REFERENCE NUMBERS

| Number | Element |
|---|---|
| 110 | Contact Hearing System |
| 112 | Contact Hearing Device |
| 114 | Grasping Tab |
| 116 | Demodulator |
| 118 | Sulcus Platform |
| 120 | Ear Tip/Light Tip/Mag Tip |
| 121 | Receiver |
| 124 | Drive Post |
| 126 | Oil Layer |
| 130 | Photodetector |
| 131 | Receive Coil |
| 132 | Audio Processor |
| 134 | Audio Processor Antenna |
| 140 | Microactuator |
| 141 | Support Structure |
| 142 | Light Pulses |
| 145 | Electromagnetic Waves |
| 144 | Springs |
| 220 | Umbo Lens |
| 250 | Taper Tube |
| 260 | Cable |
| 290 | Light Source |
| 292 | Transmit Coil |
| 310 | External Microphone |
| 312 | Canal Microphone |
| 320 | Analog to Digital Converter |
| 324 | External Communication and Control Device |
| 330 | Signal Processor |
| 338 | Acoustic Vent |
| 340 | Acoustic Input (Audible Sound) |
| 400 | Data Transmission Device |
| 402 | Data Transmission Antenna |
| 404 | Receiver Antenna |
| 406 | Receiver |
| 412 | Transmitted Signal |
| 420 | Left Data Transmission Packet |
| 422 | Right Data Transmission Packet |
| 424 | Left Wireless Chip |
| 426 | Right Wireless Chip |
| 428 | Input Buffer |
| 430 | Left Current Packet Indicator |
| 432 | Right Current Packet Indicator |
| 434 | Sampling Rate Converter |
| 436 | Converter Output Buffer |
| 438 | Digital Signal Processor |
| 440 | Clock |
| 442 | Clock Adjustment Circuitry |
| 444 | Sampling Rate Adjustment Circuitry |
| 450 | Lowpass Filter |
| 452 | Delay Circuit 452 |
| 454 | Summing Circuit |
| 456 | Summing Circuit |
| 458 | Lowpass Filter |

-continued

REFERENCE NUMBERS

| Number | Element |
|---|---|
| 460 | Lowpass Filter |
| 462 | Scaling Circuit |
| 464 | Summing Circuit |
| 466 | Integrate and Sum Circuit |
| LP | Left Current Buffer Pointer |
| RP | Right Current Buffer Pointer |
| TM | Tympanic Membrane |

What is claimed is:

1. A hearing aid system wherein a data streaming device streams data to a hearing aid, the system comprising:
a hearing aid; comprising a transmit coil, a receive coil and a microactuator, the receive coil adapted to receive signals from the transmit coil and transmit signals to the microactuator;
the hearing aid adapted to receive data from a data transmission device, wherein the data received by the hearing aid has a first sampling rate;
a sampling rate converter in the hearing aid, wherein the sampling rate converter is adapted to convert the sampling rate of the received data to a sampling rate suitable for use by digital signal processing circuitry in the hearing aid;
a buffer adapted to receive data from the sampling rate converter;
an RWDiff signal which indicates the difference between the rate at which data is read from and written to the buffer; and
a control circuit which compares the RWDiff signal to a predetermined RWIdeal quantity and generates an adjustment signal.

2. A hearing aid system according to claim 1 wherein the adjustment signal is fed back to the sampling rate converter.

3. A hearing aid system according to claim 1 wherein the adjustment signal is fed back to a clock which controls the digital signal processing circuit.

4. A hearing aid system according to claim 1 wherein the control circuit includes a lowpass filter and a PID controller.

5. A hearing aid system according to claim 4 wherein the adjustment signal is the output of the PID controller.

6. A hearing aid system according to claim 5 wherein the input to the lowpass filter is the RWDiff signal.

7. A hearing aid system wherein a data streaming device streams data to a hearing aid, the system comprising:
a hearing aid; comprising a transmit coil, a receive coil and a microactuator, the receive coil adapted to receive signals from the transmit coil and transmit signals to the microactuator;
the hearing aid adapted to receive data from a data transmission device, wherein the data received by the hearing aid has a first sampling rate;
a buffer adapted to receive data from the data transmission device;
an RWDiff signal which indicates the difference between the rate at which data is read from and written to the buffer; and
a control circuit which compares the RWDiff signal to a predetermined RWIdeal quantity and generates an adjustment signal.

8. A hearing aid system according to claim 7 wherein the adjustment signal is fed back to the clock which controls the digital signal processor.

9. A hearing aid system according to claim 8 wherein the control circuit includes a lowpass filter and a PID controller.

10. A hearing aid system according to claim 9 wherein the adjustment signal is the output of the PID controller.

11. A hearing aid system according to claim 10 wherein the input to the lowpass filter is the RWDiff signal.

12. A method of maintaining synchronization when converting a sampling rate in a hearing aid, the hearing aid comprising a transmit coil, a receive coil and a microactuator, the receive coil adapted to receive signals from the transmit coil and transmit signals to the microactuator, the method comprising the steps of:
- receiving data from a data transmission device wherein the received data has a first sampling rate;
- converting the received data from a the first sampling rate to a second sampling rate, wherein the second sampling rate is a sampling rate usable in digital signal processing circuitry in the hearing aid;
- transmitting the received data to a buffer which holds the received data until it is read by the digital signal processing circuitry;
- calculating a RWDiff signal which is a function of the difference between the rate at which date is written to the buffer and the rate at which data is read from the buffer;
- using the RWDiff signal to modify the rate at which data is either written to or read from the buffer.

13. A method according to claim 12 further including the step of using the RWDiff signal to modify the first sampling rate.

14. A method according to claim 13 further including the steps of:
- comparing the RWDiff signal to an RWIdeal quantity, wherein RWIdeal represents an ideal difference between the rate at which data is read from and the rate at which data is written to the buffer;
- generating a signal which modifies the sampling rate used in the sampling rate converter as a function of the difference between RWDiff and RWIdeal.

15. A method according to claim 14 further comprising the steps of:
- feeding the RWDiff signal into a lowpass filter; and
- feeding the output of the lowpass filter into a PID control circuit.

16. A method according to claim 14 wherein the sampling rate used in the sampling rate converter is modified in a manner which minimizes the difference between RWDiff and RWIdeal.

17. A method according to claim 12 wherein the RWDiff signal is used to modify a clock rate used in the digital signal processing circuitry.

18. A method according to claim 17 wherein the clock rate used in the digital signal processor is modified in a manner which minimizes the difference between RWDiff and RWIdeal.

* * * * *